United States Patent
Kinsho et al.

(10) Patent No.: US 7,005,480 B2
(45) Date of Patent: Feb. 28, 2006

(54) RESIN DISPERSIONS HAVING UNIFORM PARTICLE DIAMETERS, RESIN PARTICLES AND PROCESSES FOR PRODUCING BOTH

(75) Inventors: Toshihiko Kinsho, Kyoto (JP); Kazuyuki Hirai, Kyoto (JP); Masataka Mitsumoto, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 10/182,736

(22) PCT Filed: Feb. 16, 2001

(86) PCT No.: PCT/JP01/01112

§ 371 (c)(1),
(2), (4) Date: Nov. 13, 2002

(87) PCT Pub. No.: WO01/60893

PCT Pub. Date: Aug. 23, 2001

(65) Prior Publication Data

US 2003/0125479 A1    Jul. 3, 2003

(30) Foreign Application Priority Data

Feb. 16, 2000 (JP) ............................. 2000-038790

(51) Int. Cl.
*C08F 2/16* (2006.01)
(52) U.S. Cl. ............... 525/390; 523/402; 524/801; 524/837; 524/841; 524/845; 525/403; 525/420; 525/437; 525/453; 525/461
(58) Field of Classification Search ............... 523/201, 523/403, 404, 406, 407; 524/801, 802, 819, 524/839, 845, 800, 837, 841; 428/403; 525/390, 525/403, 420, 437, 453, 461
See application file for complete search history.

(56) References Cited

U.S. PATENT DOCUMENTS

| | | | |
|---|---|---|---|
| 4,837,107 A | 6/1989 | Axelsson et al. | 430/138 |
| 4,965,131 A | 10/1990 | Nair et al. | 428/407 |
| 5,068,280 A | 11/1991 | Pal et al. | 524/728 |
| 5,133,992 A | 7/1992 | Nair et al. | 427/213.34 |
| 5,296,524 A * | 3/1994 | Waters | 523/319 |
| 5,322,731 A * | 6/1994 | Callahan et al. | 428/327 |
| 5,385,975 A * | 1/1995 | Nakamura et al. | 525/101 |
| 5,541,253 A | 7/1996 | Dunaway et al. | 524/832 |
| 6,541,114 B1 * | 4/2003 | Katou et al. | 428/403 |
| 6,625,032 B1 * | 9/2003 | Ito et al. | 361/751 |

FOREIGN PATENT DOCUMENTS

| | | | |
|---|---|---|---|
| JP | 61-28688 | | 7/1986 |
| JP | 63-25664 | | 2/1988 |
| JP | 3-190934 | | 8/1991 |
| JP | 03-290672 | | 12/1991 |
| JP | 8-12853 | | 1/1996 |
| JP | 9-319144 | | 12/1997 |
| JP | 10-036460 A | * | 2/1998 |
| JP | 10-279694 | | 10/1998 |
| JP | 2000-29241 | | 1/2000 |
| WO | WO 94/20566 | | 9/1994 |

* cited by examiner

*Primary Examiner*—Marc S. Zimmer
(74) *Attorney, Agent, or Firm*—Westerman, Hattori, Daniels & Adrian, LLP

(57) ABSTRACT

The present invention provides a method of producing an aqueous dispersion. A resin (b) or a solvent solution thereof, or a precursor (b0) of the resin (b) or a solvent solution thereof is dispersed in an aqueous dispersion of resin particles (A) composed of resin (a), and is caused the precursor (b0) to react where the precursor (b0) or a solvent solution thereof is used, to prepare resin particles (B) composed of said resin (b). Thereby, an aqueous dispersion (X) of resin particles (C) having a structure such that the resin particle (A) adheres to the surface of the resin particle (B) is obtained.

23 Claims, No Drawings

RESIN DISPERSIONS HAVING UNIFORM PARTICLE DIAMETERS, RESIN PARTICLES AND PROCESSES FOR PRODUCING BOTH

TECHNICAL FIELD

The present invention relates to a resin dispersion of uniform particle diameter, resin particles, and processes for their production. More particularly, the invention relates to resin particles for use as slush molding resin, powder coatings, spacers for the manufacture of liquid crystal display and other electronic parts, standard particles for electronic measuring instruments, toners for electrophotography, electrostatic recording, electrostatic printing, etc., hot melt adhesives, and other molding materials, to an aqueous resin dispersion, and to processes for the production thereof.

BACKGROUND TECHNOLOGY

Heretofore known is the technology (dissolved resin suspending method) for preparing resin particles which comprises dissolving a resin in a solvent in advance, dispersing the resin solution in an aqueous medium in the presence of a surfactant or a dispersant (auxiliary dispersant), such as a water-soluble polymer, and removing the solvent by heating or pressure reduction (examined Japanese Patent Publication No. 28688/1986, unexamined Japanese Patent Publication No. 25664/1988, etc.), but this technology has the disadvantage that the product particles are inadequate in the uniformity of particle diameter and require a classification procedure in order that the proper diameter uniformity may be attained.

In connection with this dissolved resin suspending method, a process comprising the use of a finely divided inorganic powder, such as calcium carbonate, silica, or the like, as a dispersion stabilizer to give resin particles of uniform diameter is also known (unexamined Japanese Patent Publication No. 319144/1997, etc.).

However, the resin particles obtained by the above technologies have finely divided inorganic powders adhered. The finely divided inorganic powders are hardly removable and even if a step for their removal is interposed, the inorganic particles remaining in trace amounts adversely affect the electrical and thermal properties and chemical stability of the resin particles.

SUMMARY OF THE INVENTION

The present invention has been developed in view of the above state of the art. It is an object of the invention to provide resin particles of uniform particle diameter, an aqueous dispersion thereof, and processes for their production.

The present invention, therefore, is directed to a method of producing an aqueous dispersion which comprises dispersing a resin (b) or a solvent solution thereof, or a precursor (b0) of said resin (b) or a solvent solution thereof in an aqueous dispersion of resin particles (A) composed of resin (a) and causing the precursor (b0) to react in the case where the precursor (b0) or a solvent solution thereof is used, to prepare resin particles (B) composed of said resin (b) in said aqueous dispersion of resin particles (A) and thereby give an aqueous dispersion (X1) of resin particles (C) having a structure such that the resin particle (A) adheres to the surface of the resin particle (B).

The present invention is further directed to a method of producing an aqueous dispersion which comprises cleaving the adherent resin particle (A) and resin particle (B) from each other in the aqueous dispersion (X1) obtained by the above method and removing resin particles (A) from the aqueous dispersion to give an aqueous dispersion (X2) of resin particles (B) and to a method of producing an aqueous dispersion which comprises dissolving resin particles (A) in the aqueous dispersion (X1) obtained by the above method to give an aqueous dispersion (X2) of resin particles (B).

The present invention is further directed to an aqueous resin dispersion obtained by the above method and to a resin particle obtained by removing the aqueous medium from said aqueous resin dispersion.

Further, according to the present invention, is provided a particulate resin comprising resin particles (C) having a structure such that a resin particle (A) composed of a resin (a) adheres to the surface of a resin particle (B) composed of a resin (b)

wherein (1): the volume average particle diameter ratio of resin particles (A) to resin particles (B) is 0.001 to 0.3, (2): the volume average particle diameter of resin particles (A) is 0.01 to 30 $\mu$m and the volume average particle diameter of resin particles (B) is 0.1 to 300 $\mu$m, (3): the volume average particle diameter/number average particle diameter of resin particles (C) is 1.00 to 1.20, (4): at least 5% of the surface of the resin particle (B) is covered with the resin particle (A), (5): resin particles(C) have a BET specific surface area of 0.5 to 5.0 $m^2/g$, (6): resin particles (C) have a surface average centerline roughness Ra value of 0.01 to 0.8 $\mu$m, (7): resin particles (C) have a Wadell practical sphericity of 0.90 to 1.00, and (8): resin (a) and/or resin (b) is at least one resin selected from the group consisting of polyurethane resin, epoxy resin, vinyl resin, and polyester resin. And, in addition, is also provided a particulate resin comprising resin particles composed of a resin (b), wherein (1): the volume average particle diameter/number average particle diameter of the resin particles is 1.0 to 1.20, (2): the BET specific surface area of the resin particles is 0.5 to 5.0 $m^2/g$, (3): the surface average centerline roughness Ra value of the resin particles is 0.01 to 0.8 $\mu$m, (4): the Wadell practical sphericity of the resin particles is 0.90 to 1.00, and (5): the resin (b) is at least one resin selected from the group consisting of polyurethane resin, epoxy resin, vinyl resin, and polyester resin.

The present invention is further directed to a process for producing an aqueous dispersion which comprises separating the adherent resin particles (A) and resin particles (B) from each other in the aqueous dispersion (X1) obtained by the above process to give a mixed aqueous dispersion (X3) composed of resin particles (A) and resin particles (B).

The present invention is now described in detail.

DISCLOSURE OF INVENTION

In the present invention, the resin (a) may be any resin capable of forming an aqueous dispersion, regardless of whether it is a thermoplastic resin or a thermosetting resin. Thus, it may, for example, be vinyl resin, polyurethane resin, epoxy resin, polyester resin, polyamide resin, polyimide resin, silicone resin, phenolic resin, melamine resin, urea resin, aniline resin, ionomer resin, or polycarbonate resin. As the resin (a), two or more members of the above-mentioned group of resins may be used in combination. Preferred, in the sense that an aqueous dispersion of fine spherical resin particles can be more easily obtained, is vinyl resin, polyurethane resin, epoxy resin, or polyester resin, or a mixture of two or more of these resins.

Vinyl resins include homopolymers and copolymers of vinyl monomers. As the vinyl monomers, the following compounds (1) to (10) can be mentioned.

(1) Vinyl Hydrocarbons:

(1-1) aliphatic vinyl hydrocarbons: alkenes such as ethylene, propylene, butene, isobutylene, pentene, heptene, diisobutylene, octene, dodecene, octadecene, and other α-olefins; alkadienes such as butadiene, isoprene, 1,4-pentadiene, 1,6-hexadiene, 1,7-octadiene, etc.

(1-2) alicyclic vinyl hydrocarbons: mono- or di-cycloalkenes and alkadienes, such as cyclohexene, (di)cyclopentadiene, vinylcyclohexene, ethylidenebicycloheptene, etc.; terpenes such as pinene, limonene, indene, etc.

(1-3) aromatic vinyl hydrocarbons: styrene and hydrocarbyl (alkyl, cycloalkyl, aralkyl and/or alkenyl)-substituted styrene, e.g. α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, trivinylbenzene, etc.; and vinylnaphthalene.

(2) Carboxyl Group-Containing Vinyl Monomers and Salts thereof;

Unsaturated monocarboxylic acids and unsaturated dicarboxylic acids of 3 to 30 carbon atoms, and their anhydrides and monoalkyl (1 to 24 carbon atoms) esters, such as (meth)acrylic acids, maleic acid (anhydride), maleic acid monoalkyl esters, fumaric acid, fumaric acid monoalkyl esters, crotonic acid, itaconic acid, itaconic acid monoalkyl esters, itaconic acid glycol monoesters, citraconic acid, citraconic acid monoalkyl esters, cinnamic acid, etc.

(3) Sulfonic Acid Group-Containing Vinyl Monomers and Vinyl Sulfuric Acid Monoesters and Salts thereof:

Alkenesulfonic acids of 2 to 14 carbon atoms, such as vinylsulfonic acid, (meth)allylsulfonic acid, methylvinylsulfonic acid, and styrenesulfonic acid; and alkyl (2 to 24 carbon atoms) derivatives thereof, such as α-methylstyrenesulfonic acid etc.; sulfo(hydroxy)alkyl (meth)acrylate or -(meth)acrylamides, e.g. sulfopropyl (meth)acrylate, 2-hydroxy-3-(meth)acryloyloxypropylsulfonic acid, 2-(meth)acryloylamino-2,2-dimethylethanesulfonic acid, 2-(meth)acryloyloxyethanesulfonic acid, 3-(meth)acryloyloxy-2-hydroxypropanesulfonic acid, 2-(meth)acrylamido-2-methylpropanesulfonic acid, 3-(meth)acrylamido-2-hydroxypropanesulfonic acid, alkyl (3 to 18 carbon atoms) allylsulfosuccinic acid, poly(n=2 to 30)oxyalkylene (ethylene, propylene, butylene; homo, random or block) mono (meth)acrylate sulfate [poly(n=5 to 15)oxypropylene monomethacrylate sulfate etc.], polyoxyethylene polycyclic phenyl ether sulfate, and sulfuric acid ester or sulfonic acid group-containing monomers of the following general formulas (3-1) to (3-3); and salts thereof.

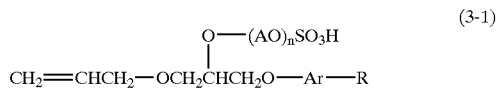 (3-1)

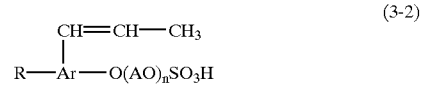 (3-2)

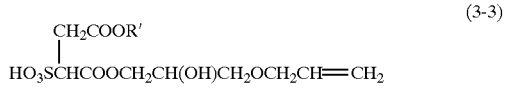 (3-3)

(wherein R represents an alkyl group of 1 to 15 carbon atoms; A represents an alkylene group of 2 to 4 carbon atoms; when n is plural, the alkylene groups may be the same or different and, when different, may be random or block; Ar represents a benzene ring; n represents an integer of 1 to 50; R' represents an alkyl group of 1 to 15 carbon atoms which may be substituted by fluorine)

(4) Phosphoric Acid Group-Containing Vinyl Monomers and Salts thereof:

Phosphoric acid (meth)acryloyloxyalkyl($C_1$–$C_{24}$) monoesters, such as 2-hydroxyethyl(meth)acryloylphosphate, phenyl-2-acryloyloxyethyl phosphate and (meth)acryloyloxyalkyl (1 to 24 carbon atoms) phosphonates such as 2-acryloyloxyethyl phosphonate etc.

The salts of the above compounds (2) to (4) include the corresponding alkali metal salts (sodium salts, potassium salts, etc.), alkaline earth metal salts (calcium salts, magnesium salts, etc.), ammonium salts, amine salts, and quaternary ammonium salts, among others.

(5) Hydroxyl Group-Containing Vinyl Monomers:

Hydroxystyrene, N-methylol(meth)acrylamide, hydroxyethyl (meth)acrylate, hydroxypropyl (meth)acrylate, polyethylene glycol mono(meth)acrylate, (meth)allyl alcohol, crotyl alcohol, isocrotyl alcohol, 1-buten-3-ol, 2-buten-1-ol, 2-butene-1,4-diol, propargyl alcohol, 2-hydroxyethyl propenyl ether, sucrose allyl ether, etc.

(6) Nitrogen-Containing Vinyl Monomers (6-1) Amino group-containing vinyl monomers: aminoethyl (meth)acrylate, dimethylaminoethyl (meth)acrylate, diethylaminoethyl (meth)acrylate, t-butylaminoethyl methacrylates, N-aminoethyl(meth)acrylamide, (meth)allylamine, morpholinoethyl (meth)acrylate, 4-vinylpyridine, 2-vinylpyridine, crotylamine, N,N-dimethylaminostyrene, methyl α-acetoaminoacrylate, vinylimidazole, N-vinylpyrrole, N-vinylthiopyrrolidone, N-arylphenylenediamine, aminocarbazole, aminothiazole, aminoindole, aminopyrrole, aminoimidazole, and aminomercaptothiazole, and salts thereof, among others.

(6-2) Amide group-containing vinyl monomers: (meth)acrylamide, N-methyl(meth)acrylamide, N-butylacrylamide, diacetoneacrylamide, N-methylol(meth)acrylamide, N,N'-methylenebis(meth)acrylamide, cinnamic acid amide, N,N-dimethylacrylamide, N,N-dibenzylacrylamide, methacrylformamide, N-methyl-N-vinylacetamide, N-vinylpyrrolidone, etc.

(6-3) Nitrile group-containing vinyl monomers: (meth)acrylonitirle, cyanostyrene, cyanoacrylates, etc.

(6-4) Quaternary ammonium cation group-containing vinyl monomers: quaternization products of tertiary amine group-containing vinyl monomers such as dimethylaminoethyl (meth)acrylate, diethylaminoethyl (meth)acrylate, dimethylaminoethyl(meth)acrylamide, diethylaminoethyl (meth)acrylamide, diallylamine, etc. (as quaternized with a quaternizing agent such as methyl chloride, dimethylsulfuric acid, benzyl chloride, dimethyl carbonate or the like)

(6-5) Nitro group-containing vinyl monomers: nitrostyrene etc.

(7) Epoxy Group-Containing Vinyl Monomers:

Glycidyl (meth)acrylate, tetrahydrofurfuryl (meth)acrylate, p-vinylphenylphenyl oxide, etc.

(8) Halogen Element-Containing Vinyl Monomers:

Vinyl chloride, vinyl bromide, vinylidene chloride, allyl chloride, chlorostyrene, bromostyrene, dichlorostyrene, chloromethylstyrene, tetrafluorostyrene, chloroprene, etc.

(9) Vinyl Esters, Vinyl (Thio)Ethers, Vinyl Ketones and Vinyl Sulfones:

(9-1) Vinyl esters, such as vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl (meth)acrylate, vinyl methoxyacetate, vinyl benzoate, ethyl α-ethoxyacrylate, alkyl (meth)acrylates having an alkyl group containing 1 to 50 carbon atoms [methyl (meth)acrylate, ethyl (meth)acrylate, propyl (meth)acrylate, butyl (meth)acrylate, 2-ethylhexyl (meth)acrylate, dodecyl (meth)acrylate, hexadecyl (meth)acrylate, heptadecyl (meth)acrylate, eicosyl (meth)acrylate, etc.], dialkyl fumarates (each of the two alkyl groups is a straight-chain, branched, or cyclic group of 2 to 8 carbon atoms), dialkyl maleates (each of the two alkyl groups is a straight-chain, branched, or cyclic group of 2 to 8 carbon atoms), poly (meth)allyloxyalkanes [diallyloxyethane, triallyloxyethane, tetraallyloxyethane, tetraallyloxypropane, tetraallyloxybutane, tetramethallyloxyethane, etc.], etc., vinyl monomers having a polyalkylene glycol chain [polyethylene glycol (mol. wt. 300) mono(meth)acrylate, polypropylene glycol (mol. wt. 500) monoacrylate, methyl alcohol-ethylene oxide (10 mol) adduct (meth)acrylates, lauryl alcohol-ethylene oxide (30 mol) adduct (meth)acrylates, etc.], poly(meth) acrylates [poly(meth)acrylates of polyhydric alcohols: ethylene glycol di(meth)acrylate, propylene glycol di(meth) acrylate, neopentyl glycol di(meth)acrylate, trimethylolpropane tri(meth)acrylate, polyethylene glycol di(meth)acrylate, etc.], etc.;

(9-2) Vinyl (thio) ethers, such as vinyl methyl ether, vinyl ethyl ether, vinyl propyl ether, vinyl butyl ether, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, acetoxystyrene, phenoxystyrene, etc.;

(9-3) Vinyl ketones, such as vinyl methyl ketone, vinyl ethyl ketone, vinyl phenyl ketone, etc.;

(9-4) Vinyl sulfones, such as divinyl sulfide, p-vinyldiphenyl sulfide, vinylethyl sulfide, vinyl ethyl sulfone, divinyl sulfone, divinyl sulfoxide, etc.

(10) Other Vinyl Monomers:

Isocyanatoethyl (meth)acrylate, m-isopropenyl-α, α-dimethylbenzyl isocyanate, etc.

Copolymers of the vinyl monomers include polymers obtainable by copolymerizing two or more species of the monomers mentioned above under (1) through (10) in any desired ratio, thus including styrene-(meth)acrylate copolymer, styrene-butadiene copolymer, (meth)acrylic acid-acrylate copolymer, styrene-acrylonitrile copolymer, styrene-maleic anhydride copolymer, styrene-(meth)acrylic acid copolymer, styrene-(meth)acrylic acid-divinylbenzene copolymer, and styrene-styrenesulfonic acid-(meth)acrylate copolymer, among others.

The resin (a) should form said resin particles (A) in an aqueous dispersion medium and it is, therefore, necessary that the resin (a) should not completely dissolve in water at least under the conditions giving rise to aqueous dispersion (X1). Therefore, when the vinyl resin is a copolymer, the relative amount of the hydrophobic monomer and hydrophilic monomer constituting the vinyl resin is preferably such that the hydrophobic monomer accounts for not less than 10%, more preferably not less than 30%, though it depends on the species of monomers chosen. If the proportion of the hydrophobic monomer is less than 10%, the vinyl resin will become water-soluble so that the particles diameter uniformity of resin particles (C) will be adversely affected. The hydrophilic monomer referred to above is a monomer which is soluble in water in any desired proportion, while the hydrophobic monomer is a monomer not conforming to the above definition (a monomer which is essentially immiscible with water).

As the polyester resin, a polycondensate of a polyol with a polycarboxylic acid, an acid anhydride thereof or a lower alkyl ester thereof can be mentioned. The polyol includes diols (11) and polyols (12) with three or more hydroxyl groups; the polycarboxylic acid, acid anhydride or lower alkyl ester mentioned above includes dicarboxylic acids (13), polycarboxylic acids (14) with three or more carboxyl groups and the corresponding acid anhydrides and lower alkyl esters.

The ratio of the polyol to the polycarboxylic acid, in terms of hydroxy [OH]/carboxy[COOH], is generally 2/1 to 1/1, preferably 1.5/1 to 1/1, more preferably 1.3/1 to 1.02/1.

As the diol (11) referred to above, there can be mentioned alkylene glycols (ethylene glycol, 1,2-propylene glycol, 1,3-propylene glycol, 1,4-butanediol, 1,6-hexanediol, octanediol, decanediol, dodecanediol, tetradecanediol, neopentyl glycol, 2,2-diethyl-1,3-propanediol, etc.);

alkylene ether glycols (diethylene glycol, triethylene glycol, dipropylene glycol, polyethylene glycol, polypropylene glycol, polytetramethylene ether glycol, etc.);

alicyclic diols (1,4-cyclohexanedimethanol, hydrogenated bisphenol A, etc.);

bisphenol compounds (bisphenol A, bisphenol F, bisphenol S, etc.);

alkylene oxide (ethylene oxide, propylene oxide, butylene oxide or the like) adducts of said alicyclic diols;

alkylene oxide (ethylene oxide, propylene oxide, butylene oxide or the like) adducts of said bisphenol compounds; and polylactonediols (poly-ε-caprolactonediol etc.), polybutadienediol, etc.; among others.

The preferred, among these, are alkylene glycols of 2 to 12 carbon atoms and alkylene oxide adducts of bisphenols and it is especially preferable to use alkylene oxide adducts of bisphenols, either as they are or in combination with alkylene glycols of 2 to 12 carbon atoms.

The polyols (12) with three or more hydroxyl groups referred to above includes tri- through octa-, or even polyhydric, aliphatic alcohols (glycerol, trimethylolethane, trimethylolpropane, pentaerythritol, sorbitol, etc.);

trisphenols (trisphenol PA etc.);

novolak resins (phenol novolak, cresol novolak, etc.);

alkylene oxide adducts of said trisphenols;

alkylene oxide adducts of said novolak resins; and acrylic polyols [e.g. copolymers of hydroxyethyl (meth) acrylate with other vinyl monomers], among others.

The preferred, among these, are tri- through octahydric, or further polyhydric, aliphatic alcohols and alkylene oxide adducts of novolak resins, with alkylene oxide adducts of novolak resins being particularly preferred.

The dicarboxylic acid (13) referred to above includes alkylenedicarboxylic acids (succinic acid, adipic acid, sebacic acid, azelaic acid, dodecanedicarboxylic acid, octadecanedicarboxylic acid, etc.); alkenylenedicarboxylic acids (maleic acid, fumaric acid, etc.), branched-chain alkylenedicarboxylic acids containing 8 or more carbon atoms [dimer acid, alkenylsuccinic acids (dodecenylsuccinic acid, pentadecenylsuccinic acid, octadecenylsuccinic acid, etc.); alkylsuccinic acids (decylsuccinic acid, dodecylsuccinic acid, octadecylsuccinic acid, etc.)], and aromatic dicarboxylic acids (phthalic acid, isophthalic acid, terephthalic acid, naphthalenedicarboxylic acid, etc.), and so forth. The preferred, among these, are alkenylenedicarboxylic acids containing 4 to 20 carbon atoms and aromatic dicarboxylic acids containing 8 to 20 carbon atoms.

The polycarboxylic acid (14) with three or more carboxyl groups referred to above includes aromatic polycarboxylic acids of 9 to 20 carbon atoms (trimellitic acid, pyromellitic acid, etc.).

As the dicarboxylic acid (13) or polycarboxylic acid (14) with three or more carboxyl groups, the acid anhydrides and lower alkyl esters (e.g. methyl, ethyl, and isopropyl esters) of said specific acids can be employed.

The polyurethane resin includes the polyaddition product of a polyisocyanate (15) and an active hydrogen group-containing compound (D) (water, a polyol [said diol (11) or polyols (12) with three or more hydroxyl groups], a dicarboxylic acid (13) or a polycarboxylic acid (14) with three or more carboxyl groups, a polyamine (16), a polythiol (17), etc.).

The polyisocyanate (15) includes aromatic polyisocyanates of 6 to 20 carbon atoms (exclusive of the carbon in the NCO group; the same applies hereinafter), aliphatic polyisocyanates of 2 to 18 carbon atoms, alicyclic polyisocyanates of 4 to 15 carbon atoms, aralipatic polyisocyates of 8 to 15 carbon atoms, and modification products of such polyisocyanates (modified polyisocyanates having urethane, carbodiimide, allophanate, urea, biuret, urethodione, urethoimine, isocyanurate, or oxazolidone groups) and mixtures of two or more of these compounds.

As typical species of said aromatic polyisocyanate, there can be mentioned 1,3- and/or 1,4-phenylene diisocyanate, 2,4- and/or 2,6-tolylene diisocyanate (TDI), crude TDI, 2,4'- and/or 4,4'-diphenylmethane diisocyanate (MDI), crude MDI {phosgenide of crude diaminophenylmethane [a condensation product of formaldehyde with an aromatic amine (e.g. aniline) or a mixture of different species thereof; a mixture of diaminodiphenylmethane and a small amount (e.g. 5 to 20 weight %) of a polyamine with three or more amino groups]; polyallyl polyisocyanate (PAPI)}, 1,5-naphthalene diisocyanate, 4,4',4"-triphenylmethane triisocyanate, m- and p-isocyanatophenylsulfonyl isocyanate, and so forth.

As typical species of said aliphatic polyisocyanate, there can be mentioned ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatemethyl caproate, bis(2-isocyanatoethyl) fumarate, bis(2-isocyanatoethyl) carbonate, 2-isocyanatoethyl 2,6-diisocyanatohexanoate, and so forth.

As typical species of said alicyclic polyisocyanate, there can be mentioned isophorone diisocyanate (IPDI), dicyclohexylmethane 4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- and/or 2,6-norbornane diisocyanate, and so forth.

The aralipatic polyisocyanate specifically includes m- and/or p-xylylene diisocyanate (XDI), α,α,α',α'-tetramethylxylylene diisocyanate (TMXDI), and so forth.

Among said modification products of polyisocyanates are modified polyisocyanates containing any of urethane, carbodiimide, allophanate, urea, biuret, urethodione, urethoimine, isocyanurate, and oxazolidone groups.

More particularly, such modification products of polyisocyanates as modified MDI (urethane-modified MDI, carbodiimide-modified MDI, trihydrocarbyl phosphate-modified MDI, etc.), urethane-modified TDI, etc. and mixtures of two or more of such isocyanates [for example, the combination use of said modified MDI and said urethane-modified TDI (isocyanate-containing prepolymer)] are included.

The preferred, among these, are aromatic polyisocyanates of 6 to 15 carbon atoms, aliphatic polyisocyanates of 4 to 12 carbon atoms and alicyclic polyisocyanates of 4 to 15 carbon atoms, with TDI, MDI, HDI, hydrogenated MDI, and IPDI being particularly preferred.

The polyamine (16) referred to above includes, among others, aliphatic polyamine compounds ($C_2$–$C_{18}$): (a) aliphatic polyamines {$C_2$–$C_6$ alkylenediamines (e.g. ethylenediamine, propylenediamine, trimethylenediamine, tetramethylenediamine, hexamethylenediamine, etc.), polyalkylene($C_2$–$C_6$) polyamines [e.g. diethylenetriamine, iminobispropylamine, bis(hexamethylene)triamine, triethylenetetramine, tetraethylenepentamine, pentaethylenehexamine, etc.]}; (b) the corresponding alkyl($C_1$–$C_4$)- or hydroxyalkyl($C_2$–$C_4$)-substituted polyamines [e.g. dialkyl($C_1$–$C_3$) aminopropylamine, trimethylhexamethylenediamine, aminoethylethanolamine, 2,5-dimethyl-2,5-hexamethylenediamine, methyliminobispropylamine, etc.]; (c) alicycle or heterocycle-containing aliphatic polyamines [e.g. 3,9-bis(3-aminopropyl)-2,4,8,10-tetraoxaspiro[5,5]undecane etc.]; (d) aromatic ring-containing aliphatic amines ($C_8$–$C_{15}$) (e.g. xylylenediamine, tetrachloro-p-xylylenediamine, etc.);

alicyclic polyamines ($C_4$–$C_{15}$): 1,3-diaminocyclohexane, isophoronediamine, menthenediamine, 4,4'-methylenedicyclohexanediamine (hydrogenated methylenedianiline), etc.;

heterocyclic polyamines ($C_4$–$C_{15}$) piperazine, N-aminoethylpiperazine, 1,4-diaminoethylpiperazine, 1,4-bis(2-amino-2-methylpropyl)piperazine, etc.;

aromatic polyamine compounds ($C_6$–$C_{20}$) (a) unsubstituted aromatic polyamines [e.g. 1,2-, 1,3- and 1,4-phenylenediamine, 2,4'- and 4 4'-diphenylmethanediamine, crude diphenylmethanediamine (polyphenylpolymethylenepolyamine), diaminodiphenyl sulfone, benzidine, thiodianiline, bis(3,4-diaminophenyl) sulfone, 2,6-diaminopyridine, m-aminobenzylamine, triphenylmethane-4,4',4"-triamine, naphthylenediamine, etc.]; (b) aromatic polyamines nuclearly substituted by alkyl groups ($C_1$–$C_4$ alkyl such as methyl, ethyl, n- or i-propyl, and buytl) [e.g. 2,4- and 2,6-trilenediamine, crude tolylenediamine, diethyltolylenediamine, 4,4'-diamino-3,3'-dimethyldiphneylmethane, 4,4'-bis(o-toluidine), dianisidine, diaminoditolyl sulfone, 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3, 5-triisopropyl-2,4-diaminobenzene, 1-methyl-3,5-diethyl-2, 4-diaminobenzene, 1-methyl-3,5-diethyl-2,6- diaminobenzene, 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphtalene, 3,3',5,5'-tetramethylbenzidine, 3,3',5,5'-tetraisopropylbenzidine, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diaminodiphenylether, 3,3',5,5'-tetraisopropyl-4,4'-diaminodiphenyl sulfone, etc.] and mixtures of isomers thereof in various ratios; (c) aromatic polyamines having electron-withdrawing groups (halogen, e.g. Cl, Br, I and F; alkoxyl groups, e.g. methoxy, ethoxy, etc.; nitro; etc.) as nuclear substituents [e.g. methylenebis-o-chloroaniline, 4-chloro-o-phenylenediamine, 2-chloro-1,4-phenylenediamine, 3-amino-4-chloroaniline, 4-bromo-1,3-phenylenediamine, 2,5-dichloro-1,4-phenylenediamine, 5-nitro-1,3-phenylenediamine, 3-dimethoxy-4-aminoaniline; 4,4'-diamino-3,3'-dimethyl-5,5'-dibromodiphenylmethane, 3,3'-dichlorobenzidine, 3,3'-dimethoxybenzidine, bis(4-amino-3-chlorophenyl) oxide, bis(4-amino-2-chlorophenyl) propane, bis(4-amino-2-chlorophenyl) sulfone, bis(4-amino-3-methoxyphenyl)decane, bis(4-aminophenyl) sulfide, bis(4-aminophenyl) telluride, bis(4-aminophenyl) selenide, bis(4-amino-3-methoxyphenyl) disulfide, 4,4'-methylenebis(2-iodoaniline), 4,4'-methylenebis(2-bromoaniline), 4,4'-methylenebis(2-fluoroaniline), 4-aminophenyl-2-chloroaniline, etc.]; (d) secondary amino group-containing aromatic polyamines [the —$NH_2$ groups in said aromatic polyamines (a)–(c) have been partially or totally replaced with —NH—R' groups (where R' represents an alkyl group, e.g. a lower alkyl group such as methyl, ethyl or the like)][e.g. 4,4'-di(methylamino)diphenylmethane, 1-methyl-2-methylamino-4-aminobenzene, etc.], polyamide polyamines: low molecular weight polyamide polyamines obtainable by condensation of a dicarboxylic acid (e.g. dimer acid) with an excess (at least 2 mols per mol of the acid) of a polyamine (e.g. the alkylenediamine or polyalkylenepolyamine mentioned above), polyether polyamines: hydrides of cyanoethylation products of polyether polyols (e.g. polyalkylene glycol), etc.

The polythiol (17) includes ethylenedithiol, 1,4-butanedithiol, 1,6-hexanedithiol, and so forth.

The epoxy resin includes the ring-opening polymerization product of a polyepoxide (18), the polyaddition product of a polyepoxide (18) and an active hydrogen group-containing compound (D) {e.g. water, a polyol [said diol (11) or polyols (12) with three or more hydroxyl groups], said dicarboxylic acid (13) or polycarboxylic acid (14) with three or more carboxyl groups, polyamine (16), polythiol (17), etc.} and the curing reaction product of said polyepoxide (18) with the acid anhydride of said dicarboxylic acid (13) or polycarboxylic acid (14) with three or more carboxyl groups.

The polyepoxide (18) is not particularly restricted provided that it contains two or more epoxy groups within the molecule. The species of polyepoxide (18) which are preferred from mechanical property points of view have 2 to 6 epoxy groups within the molecule. The epoxy equivalent (molecular weight per epoxy group) of such polyepoxide (18) is usually 65 to 1,000, preferably 90 to 500. If the epoxy equivalent exceeds 1,000, the crosslinked structure will be loose and the physicochemical properties, such as water resistance, chemical resistance, mechanical strength, etc., of the cured product will be adversely affected. On the other hand, any polyepoxide having an epoxy equivalent less than 65 can hardly be synthesized.

As examples of the polyepoxide (18), there can be mentioned aromatic polyepoxy compounds, heterocyclic polyepoxy compounds, alicyclic polyepoxy compounds, and aliphatic polyepoxy compounds.

The aromatic polyepoxy compound referred to above includes the glycidyl ethers and glycidyl esters of polyphenol compounds, glycidyl-aromatic polyamines, and glycidylation products of aminophenols, among others.

As said glycidyl ethers of polyphenols, there can be mentioned bisphenol F diglycidyl ether, bisphenol A diglycidyl ether, bisphenol B diglycidyl ether, bisphenol AD diglycidyl ether, bisphenol S diglycidyl ether, bisphenol A diglycidyl halides, tetrachlorobisphenol A diglycidyl ether, catechin diglycidyl ether, resorcinol diglycidyl ether, hydroquinone diglycidyl ether, pyrogallol triglycidyl ether, 1,5-dihydroxynaphthalene diglycidyl either, dihydroxybiphenyl diglycidyl ether, octachloro-4,4'-dihydroxybiphenyl diglycidyl ether, tetramethylbiphenyl diglycidyl ether, dihydroxynaphthylcresol triglycidyl ether, tris(hydroxyphenyl)methane triglycidyl ether, dinaphthyltriol triglycidyl ether, tetrakis(4-hydroxyphenyl)ethane tetraglycidyl ether, p-glycidylphenyldimethyltolyl-bisphenol A glycidyl ether, trismethyl-tert-butylhydroxymethane triglycidyl ether, 9,9'-bis(4-hydroxyphenyl)fluorene diglycidyl ether, 4,4'-oxybis(1,4-phenylethyl)tetracresol glycidyl ether, 4,4-oxybis(1,4-phenylethyl)phenyl glycidyl ether, bis(dihydroxynaphthalene) tetraglycidyl ether, the glycidyl ether of phenol or cresol novolak resin, the glycidyl ether of limonene phenol novolak resin, the diglycidyl ether obtainable by the reaction of 2 mols of bisphenol A with 3 mols of epichlorohydrin, polyglycidyl ethers of polyphenols obtainable by the condensation reaction of phenol and glyoxal, glutaraldehyde, or formaldehyde, and the polyphenol polyglycidyl ether obtainable by the condensation reaction of resorcinol and acetone.

As the glycidyl esters of polyphenol compounds, there can be mentioned diglycidyl phthalate, diglycidyl isophthalate, diglycidyl terephthalate, and so forth.

The glycidyl aromatic polyamine referred to above includes N,N-diglycidylaniline, N,N,N',N'-tetraglycidylxylylenediamine, N,N,N',N'-tetraglycidyldiphenylmethanediamine and so forth.

Furthermore, in the present invention, the aromatic polyepoxy compound referred to above further includes p-aminophenol triglycidyl ether, the diglycidyl urethane compound obtainable by the addition reaction of tolylene diisocyanate or diphenylmethane diisocyanate and glycidol, the glycidyl group-containing polyurethane (pre)polymer obtainable by reacting the two reactants mentioned just above plus a polyol, and the diglycidyl ethers of bisphenol A-alkylene oxide (ethylene oxide or propylene oxide) adducts.

The heterocyclic polyepoxy compound includes triglycidylmelamine, among others.

The alicyclic polyepoxy compound includes vinylcyclohexene dioxide, limonene dioxide, dicyclopentadiene dioxide, bis(2,3-epoxycyclopentyl) ether, ethylene glycol bisepoxydicyclopentyl ether, 3,4-epoxy-6-methylcyclohexylmethyl-3',4'-epoxy-6'-methylcyclohexanecarboxylate, bis(3,4-epoxy-6- methylcyclohexylmethyl) adipate, bis(3,4-epoxy-6-methylcyclohexylmethyl)butylamine, dimer acid diglycidyl ester, and so forth.

The alicyclic polyepoxy compound includes the nuclear hydrogenation products of aromatic polyepoxy compounds mentioned above.

The aliphatic polyepoxy compound includes polyglycidyl ethers of polyhydric aliphatic alcohols, polyglycidyl esters of polybasic aliphatic acids, and glycidyl aliphatic amines.

The polyglycidyl ethers of polyhydric aliphatic alcohols include ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane polyglycidyl ether, glycerol polyglycidyl ether, pentaerythritol polyglycidyl ether, sorbitol polyglycidyl ether, polyglycerol polyglycidyl ether and so forth.

The polyglycidyl esters of polybasic aliphatic acids include diglycidyl oxalate, diglycidyl maleate, diglycidyl succinate, diglycidyl glutarate, diglycidyl adipate, diglycidyl pimelate, and so forth.

The glycidyl aliphatic amines include N,N,N',N'-tetraglycidyl hexamethylenediamine.

Furthermore, the aliphatic polyepoxy compound in the present invention includes (co)polymers of diglycidyl ethers and glycidyl (meth)acrylates.

The preferred, among the compounds mentioned above, are aliphatic polyepoxy compounds and aromatic polyepoxy compounds. In the present invention, the polyepoxide may be used in a combination of two or more species.

In the present invention, wherein the resin (b) or a solvent solution thereof, or a precursor (b0) of resin (b) or a solvent solution thereof, is dispersed in an aqueous dispersion of resin particles (A) composed of resin (a) and, where necessary, the reaction of the precursor (b0) is carried out to form resin particles (B), whereby the resin particle (A) is adsorbed, as it forms, on the surface of the resin particle (B) to prevent coalescence of resin particles (B) among themselves or of resin particles (C) among themselves and make it difficult for the resin particle (C) to be cleaved under high-shear conditions. As a result, the particle diameter of resin particles (C) can be converged to achieve a more effective particle diameter uniformity. Therefore, as desirable characteristics, resin particles (A) should have such a level of strength not causing disintegration due to shear at the dispersing temperature, be hard to dissolve or swell in water, and further be hard to dissolve or swell in the resin (b) or a solvent solution thereof, or said precursor (b0) of resin (b) or a solvent solution thereof.

From the standpoint of the particle diameter uniformity, powder flowability, heat resistance during storage, and stress resistance of resin particles (C), the glass transition temperature (Tg) of resin (a) should be generally 0° C. to 300° C., preferably 20° C. to 250° C., more preferably 50° C. to 200° C. If the Tg value is lower than the temperature at which the aqueous dispersion (X1) is prepared, the effect of preventing said coalescence and cleavage and the effect of improving the particle diameter uniformity will be diminished. It should be understood that Tg in the context of the invention means the value obtained by DSC determination.

In terms of Shore D hardness which is a standard of hardness, the hardness of resin particles (A) should be generally not less than 30, preferably within the range of 45 to 100. Moreover, the hardness after a prescribed duration of immersion in water or a solvent is also preferably within the above range.

For the purpose of reducing the potential of resin particles (A) to dissolve or swell in water or a solvent for dispersion, it is good practice to suitably adjust the molecular weight, SP value (the method for SP calculation is as described in Polymer Engineering and Science, February, 1974, Vo. 14, No. 2, pp. 147–154), crystallinity, molecular weight between crosslinking points, and other parameters of resin (a).

The number average molecular weight (measured by GPC; hereinafter abbreviated as Mn) of resin (a) is generally 200 to 5,000,000, preferably 2,000 to 500,000, and the SP value of resin (a) is generally 7 to 18, preferably 8 to 14. The melting point (DSC) of resin (a) is generally not lower than 50° C., preferably not lower than 80° C. Moreover, a crosslinked structure may be introduced into resin (a). The molecular weight between crosslinking points in such a case is generally not less than 30, preferably not less than 50. For the purpose of enhancing the heat resistance, water resistance, chemical resistance, particle diameter uniformity, etc. of resin particles (C), a crosslinked structure may be introduced into resin (a) with advantage. Such a crosslinked structure may be through any of covalent bonding, coordination bonding, ionic bonding, hydrogen bonding and so on.

On the other hand, when it is desired to form an aqueous dispersion (X2) of resin particles (B) by dissolving out resin particles (A) from resin particles (C), it is preferable not to introduce a crosslinked structure.

The technology of processing resin (a) into an aqueous dispersion of resin particles (A) is not particularly restricted but includes the following methods (1) to (8).

(1): As applicable to a vinyl resin, the method starting with the monomer which comprises producing an aqueous dispersion of resin particles (A) directly by the polymerization, such as suspension polymerization, emulsion polymerization, seed polymerization or dispersion polymerization, of the monomer.

(2): As applicable to a polyaddition or condensation resin, such as a polyester resin, a polyurethane resin, an epoxy resin or the like, the method which comprises dispersing a precursor (monomer or oligomer) or a solvent solution thereof in an aqueous medium in the presence of a suitable dispersant and, then, causing it to cure by heating or adding a curing agent to give an aqueous dispersion of resin particles (A).

(3): As applicable to a polyaddition or condensation resin such as a polyester resin, a polyurethane resin, an epoxy resin, or the like, the method which comprises dissolving an appropriate emulsifier in a precursor (monomer or oligomer) or a solvent solution thereof (which is preferably a liquid; may be liquefied by heating) and, then, adding water for phase-reversal emulsification.

(4): The method which comprises preparing a resin by a polymerization reaction (which may be any polymerization reaction mode, such as addition polymerization, ring-opening polymerization, polyaddition polymerization, addition-condensation polymerization, condensation polymerization, etc.) in advance, crushing it with a mechanical rotary, jet type or other micropulverizer, classifying the resulting powder to obtain resin particles (A), and dispersing the resin particles thus obtained in water in the presence of an appropriate dispersant.

(5): The method which comprises preparing a resin by a polymerization reaction (which may be any polymerization reaction mode, such as addition polymerization, ring-opening polymerization, polyaddition polymerization, addition-condensation polymerization, condensation polymerization, etc.) in advance, dissolving it in a solvent, spraying the resin solution in a mist form to give resin particles (A), and dispersing the resin particles thus obtained in water in the presence of an appropriate dispersant.

(6): The method which comprises preparing a resin by a polymerization reaction (which may be any polymerization reaction mode, such as addition polymerization, ring-opening polymerization, polyaddition polymerization, addition-condensation polymerization, condensation polymerization, etc.) in advance, dissolving the resin in a solvent and adding a poor solvent to the resin solution or dissolving the resin in a solvent by heating and cooling the solution to precipitate resin particles, removing the solvent to recover resin particles (A), and dispersing the resin particles thus obtained in water in the presence of a suitable dispersant.

(7): The method which comprises preparing a resin by a polymerization reaction (which may be any polymerization reaction mode, such as addition polymerization, ring-opening polymerization, polyaddition polymerization, addition-condensation polymerization, condensation polymerization, etc.) in advance, dissolving the resin in a solvent, dispersing the resin solution in an aqueous medium in the presence of a suitable dispersant, and heating or decompressing the aqueous dispersion to remove the solvent.

(8): The method which comprises preparing a resin by a polymerization reaction (which may be any polymerization reaction mode, such as addition polymerization, ring-opening polymerization, polyaddition polymerization, addition-condensation polymerization, condensation polymerization, etc.) in advance, dissolving the resin in a solvent, dissolving a suitable emulsifier in the resin solution and adding water for phase-reversal emulsification.

Referring to the above methods (1)–(8), the emulsifier or dispersant may be any of the known surfactant (S) and water-soluble polymer (T). Furthermore, a solvent (U), a plasticizer (V), etc. can be used as auxiliary emulsifier or dispersants.

The surfactant (S) includes the anionic surfactant (S-1), cationic surfactant (S-2), amphoteric surfactant (S-3), and nonionic surfactant (S-4). As the surfactant (S), two or more surfactants can be used in combination.

The anionic surfactant (S-1) includes carboxylic acids, salts thereof, sulfuric acid ester salts, salts of carboxymethylation products, salts of sulfonic acid, and salts of phosphoric acid esters.

The carboxylic acids and salts thereof include saturated or unsaturated fatty acids of 8 to 22 carbon atoms and salts thereof, and as specific examples there can be mentioned capric acid, lauric acid, myristic acid, palmitic acid, stearic acid, arachidic acid, behenic acid, oleic acid, linoleic acid, ricinoleic acid, and mixtures of higher fatty acids obtainable by saponification of coconut oil, palm kernel oil, rice bran oil, beef tallow, and so forth. As the salts, the salts of said acids with sodium, potassium, ammonium, alkanolamines, etc. can be mentioned.

The salts of sulfuric acid esters include salt of higher alcohol esters of sulfuric acid (salts of $C_{8-18}$ aliphatic alcohol sulfates), salts of higher alkyl ethers of sulfuric acid (salts of sulfates of $C_{8-18}$ aliphatic alcohol-ethylene oxide (1 to 10 mol) adducts), sulfated oil (a naturally occurring unsaturated oil or unsaturated wax has been directly sulfated and neutralized), sulfated fatty acid esters (lower alcohol esters of unsaturated fatty acids have been sulfated and neutralized), and sulfated olefins ($C_{12-18}$ olefins have been sulfated and neutralized) As the salts referred to above, the sodium, potassium, ammonium, and alkanolamine salts can be mentioned.

As examples of said salts of higher alcohol esters of sulfuric acid, there can be mentioned salts of octyl alcohol sulfate, salts of decyl alcohol sulfate, salts of lauryl alcohol sulfate, salts of stearyl alcohol sulfate, salts of sulfuric acid esters of alcohols synthesized by using a Ziegler catalyst (e.g. ALFOL 1214; product of Condea), salts of sulfuric acid esters of alcohols synthesized by oxo process (e.g. Dobanol 23, 25, 45: products of Mitsubishi Petrochemical, Tridecanol: product of Kyowa Hakko, Oxocol 1213, 1215, 1415: products of Nissan Chemical, Diadol 115-L, 115H, 135: products of Mitsubishi Kasei). As to said salts of sulfuric acid esters of higher alkyl ethers, there can be mentioned salts of sulfuric acid ester of lauryl alcohol-ethylene oxide (2 mol) adduct and salts of sulfuric acid ester of octyl alcohol-ethylene oxide (3 mol) adduct as examples. As to said sulfated oil, the sodium, potassium, ammonium and alkanolamine salts of sulfation products of castor oil, peanut oil, olive oil, rapeseed oil, beef tallow, wool wax, etc. can be mentioned. As salts of said sulfated fatty acid esters, there can be mentioned the sodium, potassium, ammonium and alkanolamine salts of sulfation products of butyl oleate, butyl ricinolate, etc. can be mentioned by way of example. As a specific example of said sulfated olefin, Teepol (Shell) can be mentioned.

As said salts of carboxymethylation products, salts of carboxymethyl derivatives of aliphatic alcohols of 8–16 carbon atoms and salts of carboxymethyl derivatives of adducts of aliphatic alcohols of 8 to 16 carbon atoms to 1 to 10 mols of ethylene oxide, among others, can be mentioned.

As said salts of carboxymethyl derivatives of aliphatic alcohols, there can be mentioned the sodium salt of carboxymethylated octyl alcohol, sodium salt of carboxymethylated decyl alcohol, sodium salt of carboxymethylated lauryl alcohol, sodium salt of carboxymethylated Dovanol 23, and sodium salt of carboxymethylated tridecanol can be mentioned by way of example. As said salts of carboxymethyl derivatives of aliphatic alcohol-ethylene oxide (1 to 10 mol) adducts, sodium salt of carboxymethyl derivative of octyl alcohol-epthylene oxide (3 mol) adduct, sodium salt of carboxymethyl derivative of lauryl alcohol-ethylene oxide (4 mol) adduct, sodium salt of carboxymethyl derivative of Dovanol 23-ethylene oxide (3 mol) adduct, and sodium salt of carboxymethyl derivative of tridecanol-ethylene oxide (5 mol) adduct can be mentioned by way of example.

The sulfonic acid salt mentioned above includes, but are not limited to, salts of alkylbenzenesulfonic acids, salts of alkylnaphthalenesulfonic acids, salts of sulfosuccinic acid diesters, salts of α-olefinsulfonic acids, Igepon T series, and other sulfonic acid derivatives of aromatic ring-containing compounds.

As said salts of alkylbenzenesulfonic acids, there can be mentioned sodium dodecylbenzenesulfonate as an example; as said salts of alkylnaphthalenesulfonic acids, there can be mentioned sodium dodecylnaphthalenesulfonate as an example; and as said salts of sulfosuccinic acid diesters, there can be mentioned di-2-ethylhexyl sulfosuccinate sodium, for instance. As said sulfonic acid salts of aromatic ring-containing compounds, alkyl diphenyl ether mono- or disulfonate salts and styrenated phenol sulfonate salts, etc. can be mentioned.

As said salts of phosphate esters, there can be mentioned salts of higher alcohol phosphate esters and salts of higher alcohol-ethylene oxide adduct phosphates can be mentioned by way of example.

As said salts of higher alcohol phosphate esters, there can be mentioned lauryl alcohol phosphoric monoester disodium salt and lauryl alcohol phosphoric diester sodium salt can be mentioned as specific examples; as said salts of higher alcohol-ethylene oxide adduct phosphates, there can be mentioned oleyl alcohol-ethylene oxide (5 mol) adduct phosphoric monoester disodium salt can be mentioned as an example.

The cationic surfactant (S-2) includes quaternary ammonium salt type and amine salt type surfactants.

The quaternary ammonium salt type surfactant include compounds obtainable by the reaction of tertiary amines with a quarternizing agent (an alkylating agent, such as methyl chloride, methyl bromide, ethyl chloride, benzyl chloride, dimethyl sulfate or the like; ethylene oxide, etc.), thus including lauryltrimethylammonium chloride, dodecyldimethylammonium chloride, dioctyldimethylammonium bromide, stearyltrimethylammonium bromide, lauryldimethylbenzylammonium chloride (benzalkonium chloride), cetylpyridinium chloride, polyoxyethylenetrimethylammonium chloride, stearamidoethyldiethylmethylammonium methosulfate, and so forth.

The amine salt type surfactant is obtained by neutralizing primary to tertiary amines with an inorganic acid (e.g. hydrochloric acid, nitric acid, sulfuric acid, hydroiodic acid, etc.) or an organic acid (e.g. acetic acid, formic acid, oxalic acid, lactic acid, gluconic acid, adipic acid, alkylphosphoric acids, etc.).

For example, the primary amine salt type surfactant includes inorganic or organic acid salts of aliphatic higher amines (higher amines such as laurylamine, stearylamine, cetylamine, hydrogenated beef tallow amine, rosin amine, etc.); and higher fatty acid (stearic acid, oleic acid, etc.) salts of lower amines.

The secondary amine salt type surfactant includes inorganic or organic acid salts of aliphatic amine-ethylene oxide adducts, among others.

The tertiary amine salt type surfactant includes inorganic or organic acid salts of aliphatic amines (triethylamine, ethyldimethylamine, N,N,N',N'-tetramethylethylenediamine, etc.), aliphatic amine-ethylene oxide (2 or more moles) adducts, alicyclic amines (N-methylpyrrolidine, N-methylpiperidine, N-methylhexamethyleneimine, N-methylmorpholine, 1,8-diazabicyclo(5.4.0)-7-undecene, etc.), or nitrogen-containing heteroaromatic amines (4-dimethylaminopyridine, N-methylimidazole, 4,4'-dipyridyl, etc.); and inorganic or organic acid salts of tertiary amines, such as triethanolamine monostearate, stearamidoethyldiethylmethylethanolamine, and so forth.

The amphoteric surfactant (S-3) includes carboxylic acid salt type amphoteric surfactants, sulfuric acid ester salt type amphoteric surfactants, sulfonic acid salt type amphoteric surfactants, and phosphoric acid ester salt type amphoteric surfactants, among others.

The carboxylic acid salt type amphoteric surfactant includes amino acid type amphoteric surfactants, betaine type amphoteric surfactants, and imidazoline type amphoteric surfactants, among others.

The amino acid type amphoteric surfactant includes amphoteric surfactants having both amino and carboxylic groups within the molecule, including compounds of the following general formula, for instance.

[R—NH—(CH$_2$)$_n$—COO]$_m$M

[wherein R represents a univalent hydrocarbon group; n is usually equal to 1 or 2; m is equal to 1 or 2; M represents a hydrogen atom, an alkali metal atom, an alkaline earth metal atom, an ammonium cation, an amine cation, an alkanolamine cation or the like]

More particularly, there can be mentioned alkylaminopropionic acid type amphoteric surfactants (sodium stearylaminopropionate, sodium laurylaminopropionate, etc.); and alkylaminoacetic acid type amphoteric surfactants (sodium laurylaminoacetate etc.), among others.

The betaine type amphoteric surfactant is an amphoteric surfactant having a quaternary ammonium salt type cationic moiety and a carboxylic acid type anionic moiety, including alkyldimethyl betaines (stearyldimethylaminoacetic acid betaine, lauryldimethylaminoacetic acid betaine, etc.), amide betaines (e.g. coco-fatty acid amidopropyl betaine etc.), and alkyldihydroxyalkyl betaines (e.g. lauryldihydroxyethyl betaine), among others.

The imidazoline type amphoteric surfactant includes 2-undecyl-N-carboxymethyl-N-hydroxyethylimidazolinium betaine as an example.

As other amphoteric surfactants, there can be mentioned glycine type amphoteric surfactants such as sodium lauroylglycine, sodium lauryldiaminoethylglcyine, lauryldiaminoethylglycine hydrochloride, dioctyldiaminoethylglycine hydrochloride, etc.; and sulfobetaine type amphoteric surfactants such as pentadecylsulfotaurine and so forth.

The nonionic surfactant (S-4) includes alkylene oxide adduct type nonionic surfactants and polyhydric alcohol type nonionic surfactants, among others.

The alkylene oxide adduct type nonionic surfactant referred to above can be obtained by any of the following reactions, namely the direct addition reaction of an alkylene oxide to a higher alcohol, a higher fatty acid, an alkylamine, or the like, by reacting a higher fatty acid with a polyalkylene glycol obtainable by the addition reaction of an alkylene oxide to a glycol, by the addition reaction of an alkylene oxide to an ester obtained by reacting a higher fatty acid with a polyhydric alcohol, or by the addition reaction of an alkylene oxide to a higher fatty acid amide.

The alkylene oxide includes ethylene oxide, propylene oxide and butylene oxide, among others.

The preferred, among these, are ethylene oxide and a random or block adduct of ethylene oxide and propylene oxide.

The number of mols of the alkylene oxide to be added is preferably 10 to 50 mols, and of the alkylene oxide so added, ethylene oxide preferably accounts for 50 to 100 weight %.

The alkylene oxide adduct type nonionic surfactant includes oxyalkylene alkyl ethers (e.g. octyl alcohol-ethylene oxide adduct, lauryl alcohol-ethylene oxide adduct, stearyl alcohol-ethylene oxide adduct, oleyl alcohol-ethylene oxide adduct, lauryl alcohol-ethylne oxide/propylene oxide block adduct, etc.);

polyoxyalkylene higher fatty acid esters (e.g. stearic acid-ethylene oxide adduct, lauric acid-ethylene oxide adduct, etc.);

higher fatty acid esters of polyoxyalkylenepolyols (e.g. polyethylene glycol lauric diesters, polyethylene glycol oleic diesters, polyethylene glycol stearic diesters, etc.);

polyoxyalkylene alkylphenyl ethers (e.g. nonylphenol-ethylene oxide adduct, nonylphenol-ethylene oxide/propylene oxide block adduct, octylphenol-ethylene oxide adduct, bisphenol A-ethylene oxide adduct, dinonylphenol-ethylene oxide adduct, styrenated phenol-ethylene oxide adduct, etc.); polyoxyalkylene alkylamino ethers (e.g. laurylamine-ethylene oxide adduct, stearylamine-ethylene oxide adduct, etc.); and polyoxyalkylene alkylalkanolamides (e.g. hydroxyethyllaurylamide-ethylene oxide adduct, hydroxypropyloleylamide-ethylene oxide adduct, dihydroxyethyllaurylamide-ethylene oxide adduct, etc.).

The polyhydric alcohol type nonionic surfactant includes polyhydric alcohol fatty acid esters, polyhydric alcohol fatty acid ester-alkylene oxide adducts, polyhydric alcohol alkyl ethers, and polyhydric alcohol alkyl ether-alkylene oxide adducts.

As specific examples of the polyhydric alcohol fatty acid ester, there can be mentioned pentaerythritol monolaurate, pentaerythritol monooleate, sorbitan monolaurate, sorbitan monostearate, sorbitan dilaurate, sorbitan dioleate, sucrose monostearate, and so forth.

As specific examples of the polyhydric alcohol fatty acid ester-alkylene oxide adduct, there can be mentioned ethylene glycol monooleate-ethylene oxide adduct, ethylene glycol monostearate-ethylene oxide adduct, trimethylolpropane monostearate-ethylene oxide/propylene oxide random adduct, sorbitan monolaurate-ethylene oxide adduct, sorbitan monostearate-ethylene oxide adduct, sorbitan distearate-ethylene oxide adduct, sorbitan dilaurate ethylene oxide/propylene oxide random adduct, and so forth.

As specific examples of the polyhydric alcohol alkyl ether, there can be mentioned pentaerythritol monobutyl ether, pentaerythritol monolauryl ether, sorbitan monomethyl ether, sorbitan monostearyl ether, methyl glycoside, lauryl glycoside, and so forth.

As specific examples of the polyhydric alcohol alkyl ether-alkylene oxide adduct, there can be mentioned sorbitan monostearyl ether-ethylene oxide adduct, methyl glycoside-ethylene oxide/propylene oxide random adduct, lauryl glycoside-ethylene oxide adduct, stearyl glycoside-ethylene oxide/propylene oxide random adduct, and so forth.

The water-soluble polymer (T) includes cellulosic compounds (e.g. methylcelulose, ethylcellulose, hydroxyethylcellulose, ethylhydroxyethylcellulose, carboxymethylcellulose, and hydroxypropylcellulose, and saponification products thereof), gelatin, starch, dextrin, gum arabic, chitin, chitosan, polyvinyl alcohol, polyvinylpyrrolidone, polyethylene glycol, polyethyleneimine, polyacrylamide, acrylic acid (salt)-containing polymers (sodium polyacrylate, potassium polyacrylate, ammonium polyacrylate, sodium hydroxide-partial neutralization product of polyacrylic acid, sodium acrylate-acrylate ester copolymer), sodium hydroxide-(partial) neutralization product of styrene-maleic anhydride copolymer, and water-soluble polyurethanes (e.g. the reaction product of polyethylene glycol, polycaprolactonediol or the like with a polyisocyanate), among others.

The solvent (U) may be added to the aqueous medium at dispersion-emulsification where necessary or optionally to the dispersion to be emulsified [the oil phase containing resin (b)].

As specific examples of the solvent (U), there can be mentioned aromatic hydrocarbon solvents such as toluene, xylene, ethylbenzene, tetralin, etc.; aliphatic or alicyclic hydrocarbon solvents such as n-hexane, n-heptane, mineral spirit, cyclohexane, etc.; halogen-containing solvents such as methyl chloride, methyl bromide, methyl iodide, methylene dichloride, carbon tetrachloride, trichloroethylene, perchloroethylene, etc.; ester or ester-ether solvents such as ethyl acetate, butyl acetate, methoxybutyl acetate, methyl-cellosolve acetate, ethylcellosolve acetate, etc.; ether solvents such as diethyl ether, tetrahydrofuran, dioxane, ethylcellosolve, butylcellosolve, propylene glycol monomethyl ether, etc.; ketone solvents such as acetone, methyl ethyl ketone, methyl isobutyl ketone, di-n-butyl ketone, cyclohexanone, etc.; alcohol solvents such as methanol, ethanol, n-propanol, isopropyl alcohol, n-butanol, isobutyl alcohol, t-butyl alcohol, 2-ethylhexyl alcohol, benzyl alcohol, etc.; amide solvents such as N,N-dimethylformamide, N,N-dimethylacetamide, etc.; sulfoxide solvents such as dimethyl sulfoxide etc.; heterocyclic solvents such as N-methylpyrrolidone etc.; and mixtures of two or more of these solvents.

The plasticizer (V) may be added to the aqueous medium at dispersion-emulsification where necessary or optionally to the dispersion to be emulsified [the oil phase containing the resin (b)].

The plasticizer (V) is not restricted but includes the following by way of example.

(V1) Phthalic acid esters [dibutyl phthalate, dioctyl phthalate, butyl benzyl phthalate, diisodecyl phthalate, etc.];

(V2) Aliphatic dibasic acid esters [di-2-ethylhexyl adipate, di-2-ethylhexyl sebacate, etc.];

(V3) Trimellitic acid esters [tri-2-ethylhexyl trimellitate, trioctyl trimellitate, etc.];

(V4) Phosphoric acid esters [triethyl phosphate, tri-2-ethylhexyl phosphate, tricresyl phosphate, etc.];

(V5) Fatty acid esters [butyl oleate etc.]; and (V6) Mixtures of two or more of the above compounds.

The particle diameter of resin particles (A) is usually smaller than the particle diameter of resin particles (B), and from the standpoint of particle diameter uniformity, the particle diameter ratio [volume average particle diameter of resin particles (A)]/[volume average particle diameter of resin particles (B)] value is preferably within the range of 0.001 to 0.3. If the particle diameter ratio is larger than 0.3, the resin particles (A) will not efficiently adsorbed on the surface of resin particles (B), with the result that the particle diameter distribution of resin particles (C) tends to be broadened.

The volume average particle diameter of resin particles (A) can be judiciously adjusted within the above range of particle diameter ratio so that it will be suited for the formation of resin particles (C) of the desired particle diameter. For example, when it is desired to obtain resin particles (C) having a volume average particle diameter of 1 $\mu$m, the volume average particle diameter of resin particles (A) should preferably be 0.0005 to 0.3 $\mu$m, particularly 0.001 to 0.2 $\mu$m; in order to obtain resin particles (C) having a diameter of 10 $\mu$m, the volume average diameter of resin particles (A) should preferably be 0.005 to 3 $\mu$m, particularly 0.05 to 2 $\mu$m; and in order to obtain resin particles (C) having a diameter of 100 $\mu$m, the volume average diameter of resin particles (A) should preferably be 0.05 to 30 $\mu$m, particularly 0.1 to 20 $\mu$m. The volume average particle diameter referred to above can be measured by means of the laser particle diameter distribution analyzer LA-920 (manufactured by Horiba) or Multitizer (manufactured by Coulter).

The resin (b) for use in the present invention, like the resin (a), may be any known kind of resin and its specific examples may also be the same as those mentioned for the resin (a). For the resin (b), an optimum resin can be liberally selected according to the intended use and application. Generally speaking, polyurethane resin, epoxy resin, vinyl resin and polyester resin can be mentioned as preferred kinds of resin (b).

The Mn, melting point, Tg, and SP values of resin (b) can each be suitably controlled within the preferred range according to the intended use.

By way of illustration, when the resin particles (C) and resin particles (B) are to be used for a slush molding resin or a powder coating, the Mn of resin (b) is generally 2,000 to 500,000, preferably 4,000 to 200,000. The melting point (DSC; the same applies hereinafter to all melting point values) of resin (b) is generally 0° C. to 200° C., preferably 35° C. to 150° C. The Tg of resin (b) is usually –60° C. to 100° C., preferably –30° C. to 60° C. The SP value of resin (b) is generally 7 to 18, preferably 8 to 14.

When the intended use is a spacer for the manufacture of electronic components such as the liquid crystal display or standard particles for electronic measuring instruments, the Mn of resin (b) is generally 20,000 to 10,000,000, preferably 40,000 to 2,000,000. The melting point (DSC) of resin (b) is generally 40° C. to 300° C., preferably 70° C. to 250° C. The Tg of resin (b) is generally –0° C. to 250° C., preferably 50° C. to 200° C. The SP value of resin (b) is generally 8 to 18, preferably 9 to 14.

When the intended use is a toner for electrophotography, electrostatic recording or electrostatic printing, for instance, the Mn of resin (b) is generally 1,000 to 5,000,000, preferably 2,000 to 500,000. The melting point (DSC) of resin (b) is generally 20° C. to 300° C., preferably 80° C. to 250° C. The Tg of resin (b) is generally 20° C. to 200° C., preferably 40° C. to 200° C. The SP value of resin (b) is generally 8 to 16, preferably 9 to 14.

In the present invention, the resin (b) or a solvent solution thereof is dispersed in an aqueous dispersion of resin particles (A) composed of resin (a) to induce formation of resin particles (B) composed of resin (b) in said aqueous dispersion of resin particles (A) to produce an aqueous dispersion (X1) of resin particles (C) having a structure such that the resin particle (A) adheres to the surface of the resin particle (B).

As an alternative, a precursor (b0) of resin (b) or a solvent solution thereof is dispersed in an aqueous dispersion of resin particles (A) composed of resin (a) and the precursor (b0) is then caused to undergo reaction to induce formation of resin particles (B) composed of resin (b) in said aqueous dispersion of resin particles (A) to produce an aqueous dispersion (X1) of resin particles (C) having a structure such that the resin particle (A) adheres to the surface of the resin particle (B).

For dispersing any of said resin (b), a solvent solution thereof, said precursor (b0) of resin (b), and a solvent solution thereof, a dispersing equipment can be utilized.

The dispersing equipment which can be used in the invention is not particularly restricted but may be any machine that is classified as an emulsifier or a dispersing mill on the market. Thus, for example, batch homogenizers such as Homogenizer (manufactured by IKA), Polytron (manufactured by Kinematica) and TK Auto Homomixer (manufactured by Tokushu Kika Kogyo); continuous emulsifiers such as Ebara Milder (manufactured by Ebara Seisakusho), TK Filmix and TK Pipeline Homomixer (manufactured by Tokushu KiKa Kogyo), Colloid Mill (manufactured by Shinko Pantech), Slusher and Trigonal Wet Mill (manufactured by Mitsui Miike Kakoki), Capitron (manufactured by Eurotech), Fine Flow Mill (manufactured by Pacific Machinery), etc.; high-pressure emulsifiers such as Microfluidizer (manufactured by Mizuho Kogyo), Nanomizer (manufactured by Nanomizer), APV Gaulin (manufactured by Gaulin), etc.; membrane emulsifiers such as Membrane Emulsifier (manufactured by Reika Kogyo) etc.; and vibrating emulsifiers such as Vibromixer (manufactured by Reika Kogyo) etc.; and ultrasonic emulsifiers such as Sonic Homogenizer (manufactured by Branson) etc. can be mentioned. Among these, the preferred from particle diameter uniformity points of view are APV Gaulin, Homogenizer, TK Auto Homomixer, Ebara Milder, TK Filmix, and TK Pipeline Homomixer.

In dispersing the resin (b) in an aqueous dispersion of resin particles (A), the resin (b) is preferably a liquid. When the resin (b) is solid at room temperature, it is acceptable to disperse the resin (b) in liquid form at a temperature over its melting point, employ a solvent solution of the resin (b), or employ the precursor (b0) of resin (b) or a solvent solution thereof.

The viscosity of any of resin (b), a solvnet solution thereof, precursor (b0) of resin (b), and a solvent solution thereof should be generally 10 to 50,000 cP (as measured with a Type B viscometer), preferably 100 to 10,000 cP, from particle diameter uniformity points of view.

The dispersing temperature is usually 0 to 150° C. (under pressure), preferably 5 to 98° C. When the viscosity of the dispersoid is high, the dispersion-emulsification is preferably carried out by increasing the temperature to bring the viscosity into the preferred range mentioned above.

The solvent for said solvent solution of resin (b) or said solvent solution of precursor (b0) is not particularly restricted provided that it is a solvent capable of dissolving resin (b) at room temperature or under heating. Specifically, the same solvent species as those mentioned for solvent (U) can be employed. The preferred solvent varies with different species of resin (b) but the difference in SP value from the resin (b) is preferably not more than 3. From particle diameter uniformity points of view, the preferred solvent is a solvent which dissolves the resin (b) but does hardly dissolve or swell resin particles (A) composed of resin (a).

The precursor (b0) of resin (b) is not particularly restricted provided that it may be converted to resin (b) by chemical reaction. When resin (b) is a vinyl resin, for instance, the precursor (b0) may for example be said vinyl monomer (said species may be used each alone or in admixture) or a solvent solution thereof. When the resin (b) is a condensation resin (e.g. a polyurethane, epoxy or polyester resin), the precursor (b0) may for example be a combination of a reactive group-containing prepolymer ($\alpha$) and a curing agent ($\beta$).

When a vinyl monomer is used as said precursor (b0), the method of reacting the precursor (b0) to give the resin (b) includes the method which comprises dispersing and suspending an oil phase composed of an oil-soluble initiator, the monomer, and optionally the solvent (U) where necessary, in an aqueous dispersion of resin particles (A) in the presence of a water-soluble polymer (T) and heating the suspension to carry out a radical polymerization reaction (the so-called suspension polymerization method) and the method which comprises emulsifying an oil phase composed of the monomer and optionally the solvent (U) where necessary in an aqueous dispersion containing resin particles (A), an emulsifier (which may for example be a species of said surfactant (S)) and a water-soluble initiator and heating the mixture to carry out a radical polymerization reaction (the so-called emulsion polymerization method), among other methods.

The oil-soluble or water-soluble initiator mentioned above includes peroxide polymerization initiators (I) and azo polymerization initiators (II), among others. A peroxide polymerization initiator (I) may be used in combination with a reducing agent so as to form a redox polymerization initiator (III). Moreover, two or more of (i)-(III) may be used in combination.

(I) Peroxide Polymerization Initiator:

(I-1) Oil-soluble peroxide polymerization initiators: acetylcyclohexylsulfonyl peroxide, isobutyryl peroxide, diisopropyl peroxydicarbonate, di-2-ethylhexyl peroxydicarbonate, 2,4-dichlorobenzoyl peroxide, t-butyl peroxypivalate, 3,5,5-trimethylhexanonyl peroxide, octanoyl peroxide, decanoyl peroxide, lauroyl peroxide, stearoyl peroxide, propionitrile peroxide, succinic acid peroxide, acetyl peroxide, t-butylperoxy 2-ethylhexanoate, benzoyl peroxide, p-chlorobenzoyl peroxide, t-butyl peroxyisobutyrate, t-butylperoxymaleic acid, t-butyl peroxylaurate, cyclohexanone peroxide, t-butyl peroxyisopropylcarbonate, 2,5-dimethyl-2,5-dibenzoylperoxyhexane, t-butyl peroxyacetate, t-butyl peroxybenzoate, diisobutyl diperoxyphthalate, methyl ethyl ketone peroxide, dicumyl peroxide, 2,5-dimethyl-2,5-di-t-butylperoxyhexane, t-butylcumyl peroxide, t-butyl hydroperoxide, di-t-butyl peroxide, diisopropylbenzene hydroperoxide, p-menthane hydroperoxide, pinane hydroperoxide, 2,5-dimethylhexane-2,5-dihydroperoxide, cumene peroxide, etc.

(I-2) Water-soluble peroxide polymerizaiton initiators: hydrogen peroxide, peracetic acid, ammonium persulfate, sodium persulfate, etc.

(II) Azo Polymerizaiton Initiator:

(II-1) Oil-soluble azo polymerizaiton initiators: 2,2'-azobisisobutyronitrile, 1,1'-azobiscyclohexane-1-carbonitrile, 2,2'-azobis-4-methoxy-2,4-dimethylvaleronitirle, 2,2'-azobis-2,4-dimethylvaleronitrile, dimethyl 2,2'-azobis(2-methylpropionate), 1,1'-azobis(1-acetoxy-1-phenylethane), 2,2'-azobis(4-methoxy-2,4-dimethylvaleronitrile), etc.

(II-2) Water-soluble azo polymerization initiators: azobisamidinopropane salt, azobiscyanovaleric acid (salt), 2,2'-azobis[2-methyl-N-(2-hydroxyethyl)propionamide], etc.

(III) Redox Polymerization Initiator (III-1) Non-aqueous redox polymerization initiators: the combination use of an oil-soluble peroxide, such as a hydroperoxide, a dialkyl peroxide, a diacyl peroxide or the like, and an oil-soluble reducing agent, such as a tertiary amine, a naphthenic acid salt, a mercaptan compound, an organometal compound (e.g. triethylaluminum, triethylboron, or diethylzinc) or the like.

(III-2) Aqueous redox polymerization initiators: the combination use of a water-soluble peroxide, such as a persulfate, hydrogen peroxide, a hydroperoxide or the like, and a water-soluble inorganic or organic reducing agent (e.g. an iron (II) salt, sodium hydrosulfite, an alcohol, a polyamine or the like), among others.

As the precursor (b0), the combination of a reactive group-containing prepolymer (α) and a curing agent (β) can also be used. The "reactive group" mentioned just above means a group which may react with the curing agent (β). Here, the technology of reacting the precursor (b0) to produce the resin (b) includes the method which comprises dispersing an oil phase containing said reactive group-containing prepolymer (α), said curing agent (β), and optionally said solvent (U) where necessary in an aqueous dispersion of resin particles (A) and heating the whole dispersion to induce a reaction between the reactive group-containing prepolymer (α) and the curing agent (β) to form resin particles (B) composed of resin (b); the method which comprises dispersing the reactive group-containing prepolymer (α) or a solvent solution thereof in an aqueous dispersion of resin particles (A) and adding a water-soluble curing agent (β) thereto for carrying out a reaction to induce formation of resin particles (B) composed of resin (b); and the method applicable to the case in which the reactive group-containing prepolymer (α) will react with water and crosslink which comprises dispersing the reactive group-containing prepolymer (α) or a solvent solution thereof in an aqueous dispersion of resin particles (A) to thereby induce the reaction of the prepolymer with water and cause formation of resin particles (B) composed of resin (b), among other methods.

As regards the combination of the reactive group of said reactive group-containing prepolymer (α) and said curing agent (β), the following combinations (1) and (2) can be mentioned by way of example.

(1): A combination such that the reactive group of said reactive group-containing prepolymer (α) is a functional group (α1) reactive with an active hydrogen-containing compound and said curing agent (β) is an active hydrogen group-containing compound (β1).

(2): A combination such that the reactive group of said reactive group-containing prepolymer (α) is an active hydrogen-containing group (α2) and said curing agent (β) is a compound (β2) capable of reacting with the active hydrogen-containing group.

Among such combinations, the combination (1) is preferred from the standpoint of the reaction rate in water.

Referring to the above combination (1), the functional group (α1) which is reactive with an active hydrogen-containing compound may for example be an isocyanate group (α1a), a blocked isocyanate group (α1b), an epoxy group (α1c), an acid anhydride group (α1d), or an acid halide group (α1e). The preferred, among these, are (α1a), (α1b), and (α1c), with (α1a) and (α1b) being particularly preferred.

The blocked isocyanate group (α1b) is an isocyanate group blocked with a blocking agent.

The blocking agent mentioned above includes oximes [acetoxime, methyl isobutyl ketoxime, diethyl ketoxime, cyclopentanone oxime, cyclohexanone oxime, methyl ethyl ketoxime, etc.]; lactams [γ-butyrolactam, ε-caprolactam, γ-valerolactam, etc.]; aliphatic alcohols containing 1–20 carbon atoms [ethanol, methanol, octanol, etc.], phenols [phenol, m-cresol, xylenol, nonylphenol, etc.]; active methylene compounds [acetylacetone, ethyl malonate, ethyl acetoacetate, etc.]; basic nitrogen-containing compounds [N,N-diethylhydroxylamine, 2-hydroxypyridine, pyridine N-oxide, 2-mercaptopyridine, etc.]; and mixtures of two or more of these.

Among these, oximes are preferred and methyl ethyl ketoxime is particularly preferred.

The skeleton of said reactive group-containing prepolymer (α) includes a polyether (αw), a polyester (αx), an epoxy resin (αy) and a polyurethane (αz), among others. The preferred, among these, are (αx), (αy), and (αz), with (αx) and (αz) being particularly preferred.

The polyether (αw) includes polyethylene oxide, polypropylene oxide, polybutylene oxide, polytetramethylene oxide, and so forth.

The polyester (αx) includes the polycondensation product of a diol (11) with a dicarboxylic acid (13) and a polylactone (the ring-opening polymerization product of ε-caprolatone), among others.

The epoxy resin (αy) includes the addition-condensation product of bisphenol (bisphenol A, bisphenol F, bisphenol S, etc.) and epichlorohydrin, among others.

The polyurethane (αz) includes the polyaddition product of a diol (11) and a polyisocyanate (15) and the polyaddition product of a polyester (αx) and a polyisocyanate (15).

The technology of introducing a reactive group into the polyester (αx), epoxy resin (αy), or polyurethane (αz), for instance, includes (1): the method which comprises using one of two or more components in excess to leave the functional group of the particular constituent material at the terminal and (2): the method which comprises using one of two or more components in excess to leave the functional group of the particular constituent material at the terminal and reacting this remaining functional group with a compound having a functional group reactive with said residual functional group and a reactive group, among other methods.

By the above method (1), there can be obtained a hydroxyl group-containing polyester prepolymer, a carboxyl group-containing polyester prepolymer, an acid halide group-containing polyester prepolymer, a hydroxyl group-containing epoxy resin prepolymer, an epoxy group-containing epoxy resin prepolymer, a hydroxyl group-containing polyurethane prepolymer, or an isocyanate group-containing polyurethane prepolymer.

Regarding the ratio of the components, taking a hydroxyl group-containing polyester prepolymer as an example, the ratio of diol (11) to dicarboxylic acid (13), in terms of the hydroxyl[OH]-to-carboxyl[COOH] molar ratio, i.e. [OH]/[COOH], is generally 2/1 to 1/1, preferably 1.5/1 to 1/1, still more preferably 1.3/1 to 1.02/1. In the case of prepolymers having other skeletons and/or terminal groups, too, the ratio of components may be similar to the above, although the components are different.

In the method (2), the prepolymer obtained by the above method (1) can be reacted with a polyisocyanate to obtain an isocyanate group-containing prepolymer, with a blocked polyisocyanate to obtain a blocked isocyanate group-containing prepolymer, with a polyepoxide to obtain an epoxy group-containing prepolymer, or with a polyacid anhydride to obtain an acid anhydride-containing prepolymer.

The level of use of said compound containing both a functional group and a reactive group is as follows. Taking the case in which a hydroxyl group-containing polyester is reacted with a polyisocyanate to give an isocyanate group-containing polyester prepolymer as an example, the polyisocyanate is used in such a proportion that the molar ratio of isocyanate group [NCO] to the hydroxyl group [OH] of the hydroxyl group-containing polyester, i.e. [NCO]/[OH], is generally 5/1 to 1/1, preferably 4/1 to 1.2/1, still more preferably 2.5/1 to 1.5/1. In the case of prepolymers having other skeletons and/or terminal groups, too, the ratio of components may be similar to the above, although the components used are different.

The number of reactive groups per molecule in the reactive group-containing prepolymer (α) is generally not less than 1, preferably 1.5 to 3 on the average, still more preferably 1.8 to 2.5 on the average. Within the above range, the molecular weight of the crosslinked polymer obtainable by reaction with the curing agent (β) is increased.

The number average molecular weight of the reactive group-containing prepolymer (α) is generally 500 to 30,000, preferably 1,000 to 20,000, still more preferably 2,000 to 10,000.

The weight average molecular weight of the reactive group-containing prepolymer (α) is 1,000 to 50,000, preferably 2,000 to 40,000, still more preferably 4,000 to 20,000.

The viscosity of the reactive group-containing prepolymer (α) is generally not more than 2,000 poises, preferably not more than 1,000 poises, at 100° C. Restricting the viscosity to not more than 2,000 poises is beneficial in that resin particles (C) having a sharp particle diameter distribution can be obtained with a small amount of the solvent.

The active hydrogen group-containing compound (β1) includes polyamines (β1a) which may optionally be blocked with a removable compound, polyols (β1b), polymercaptans (β1c) and water (β1d), among others. The preferred, among these, are (β1a), (β1b) and (β1d), the more preferred are (β1a) and (β1d), and the particularly preferred are blocked polyamines and (β1d).

The (β1a) includes the same species as those of said polyamine (16). The preferred species of (β1a) are 4,4'-diaminodiphenylmethane, xylylenediamine, isophoronediamine, ethylenediamine, diethylenetriamine, triethyleneteramine, and mixtures thereof.

As examples of the cases in which (β1a) is a polyamine blocked with a removable group, there can be mentioned ketimine compounds obtainable from said polyamines and a ketone containing 3 to 8 carbon atoms (e.g. acetone, methyl ethyl ketone, methyl isobutyl ketone), aldimine compounds obtainable from aldehyde compounds containing 2 to 8 carbon atoms (e.g. formaldehyde, acetaldehyde), enamine compounds, and oxazolidine compounds, among others. Among these, ketimine compounds are preferred.

The polyol (β1b) includes compounds similar to said diol (11) and polyols (12) with three or more hydroxyl groups. The preferred is a diol (11) alone or a mixture of a diol (11) and a small proportion of a polyol (12) with three or more hydroxyl groups.

The polymercaptan (β1c) includes ethylenedithiol, 1,4-butanedithiol, and 1,6-hexanedithiol, among others.

Where necessary, a reaction terminator (βs) may be used in combination with the active hydrogen group-containing compound (β1). By using such a reaction terminator (βs) and said active hydrogen group-containing compound (β1) in a certain ratio, the molecular weight of resin (b) can be controlled to a predetermined level.

The reaction terminator (βs) includes monoamines (diethylamine, dibutylamine, butylamine, laurylamine, monoethanolamine, diethanolamine, etc.);

blocked monoamines (ketimine compounds etc.);

monools (methanol, ethanol, isopropyl alcohol, butanol, phenol, etc.);

monomercaptans (butylmercaptan, laurylmercaptan, etc.);

monoisocyanates (lauryl isocyanate, phenyl isocyanate, etc.); and monoepoxides (butyl glycidyl ether etc.), among others.

Referring to the above combination (2), the active hydrogen-containing group (α2) of said reactive group-containing prepolymer (α) includes amino (α2a), hydroxyl (alcoholic hydroxyl and phenolic hydroxyl) (α2b), mercapto (α2c), carboxyl (α2d), and an organic group (α2e) derived by blocking any of said groups with a removable group, among others. The preferred, among these, are, (α2a), (α2b), and, among species of said organic group (α2e), an amino group blocked with a removable compound. The particularly preferred is (α2b).

As the organic group derived by blocking an amino group with a removable compound, there can be mentioned groups similar to those mentioned above for (β1a).

The compound (β2) reactive with the active hydrogen-containing group includes polyisocyanates (β2a), polyepoxides (β2b), polycarboxylic acids (β2c), polycaboxylic anhydrides (β2d), and polycarboxylic acid halides (β2e), among others. Among these, (β2a), and (β2b) are preferred and (β2a) is still more preferred.

The polyisocyanate (β2a) referred to above includes the same species as said polyisocyanate (15) and the preferred species are also the same as those mentioned.

The polyepoxide (β2b) includes the same species as said polyepoxide (18) and the preferred species are also the same as those mentioned.

The polycarboxylic acid (β2c) includes dicarboxylic acids (β2c-1) and polycarboxylic acids with three or more carboxyl groups (β2c-2). The preferred is (β2c-1) alone or a mixture of (β2c-1) and a small proportion of (β2c-2).

The dicarboxylic acid (β2c-1) includes the same species as those mentioned for said dicarboxylic acid (13), and the polycarboxylic acid (β2c-2) includes the same species as those mentioned for said polycarboxylic acid (14). The preferred species are also the same as those mentioned.

The polycarboxylic anhydride (β2d) includes pyromellitic anhydride, among others.

The polycarboxylic acid halide (β2e) includes the same acid halides as those mentioned for (β2c) (acid chloride, acid bromide, acid iodide).

Furthermore, where necessary, a reaction terminator (βs) can be used in conjunction with (β2).

Regarding the level of use of the curing agent (β), the molar ratio of the reactive group [α] in reactive group-containing prepolymer (α) to the functional group [β] in curing agent (β), that is to say [α]/[β], is generally 1/2 to 2/1, preferably 1.5/1 to 1/1.5, more preferably 1.2/1 to 1/1.2. When the curing agent (β) is water (β1d), water is regarded as a bivalent active hydrogen-containing compound.

The resin (b) obtained by reacting the precursor (b0) composed of the reactive group-containing prepolymer (α) and the curing agent (β) in aqueous medium constitutes resin particles (B) and a component of resin particles (C). The weight average molecular weight of the resin (b) which is the reaction product of reactive group-containing prepolymer (α) and curing agent (β) is generally not less than 3,000, preferably 3,000 to 10,000,000, more preferably 5,000 to 1,000,000.

Furthermore, in reacting the reactive group-containing prepolymer (α) with the curing agent (β) in aqueous medium, a polymer not reactive with the reactive group-containing prepolymer (α) and curing agent (β) [the so-called dead polymer] may be allowed to be present in the reaction system. In this case, the resin (b) becomes a mixture of the resin formed by the reaction of the reactive group-containing prepolymer (α) with the curing agent (β) in the aqueous medium and the resin which has not reacted.

In the resin (a) and/or resin (b) according to the invention, there may optionally be formulated other additives (pigment, filler, charge control agent, colorant, mold release agent or parting agent, charge control agent, ultraviolet absorber, antioxidant, antiblocking agent, heat stabilizer, flame retardant, etc.). Regarding the method of mixing such other additives into resin (a) or resin (b), the additives may be incorporated in the course of formation of the aqueous dispersion in aqueous medium but it is more preferable to blend the additives with the resin (a) or resin (b) in advance and disperse the resulting blend in aqueous medium.

Furthermore, in the present invention, it is not absolutely necessary to have the additives incorporated at the formation of resin particles in aqueous medium but the additives may be added after formation of resin particles. For example, after formation of uncolored resin particles, a colorant may be added in accordance with any well-known dyeing method or the resin particles may be impregnated with the additives together with the solvent (U) and/or plasticizer (V).

The level of use of said aqueous-medium based on 100 weight parts of resin (b) is generally 50 to 2,000 weight parts, preferably 100 to 1,000 weight parts. If it is less than 50 weight parts, only a poor dispersion of resin (b) may be realized. Exceeding 2,000 weight parts would be uneconomical.

The chain extension and/or crosslinking reaction time is selected according to the reactivity which depends on the combination of the structure of the reactive group of said reactive group-containing prepolymer (α) with the curing agent (β) but is generally 10 minutes to 40 hours, preferably 30 minutes to 24 hours.

The reaction temperature is generally 0 to 150° C., preferably 50 to 120° C.

Where necessary, a known catalyst can be used. Thus, for the reaction between an isocyanate and an active hydrogen-containing compound, for instance, dibutyltin laurate, dioctyltin laurate or the like can be used.

The resin particles (C) can be obtained by the procedure which comprises dispersing the resin (b), a solvent solution of resin (b), or a precursor (b0) of resin (b) in an aqueous dispersion of resin particles (A) composed of resin (a) and, in the case of the precursor (b0), the precursor (b0) is reacted to form the resin (b), whereby an aqueous dispersion (X1) of resin particles (C) each comprising a resin particle (B) and a resin particle (A) adhered to the surface of (B) composed of resin (b) is produced in situ, and finally removing the aqueous medium from said aqueous dispersion (X1). The method of removing the aqueous medium may for example be any of the following methods.

(1): The method in which the aqueous dispersion (X1) is dried under reduced pressure or atmospheric pressure, (2): The method in which a solid-liquid separation is carried out with a centrifuge, a sparkler filter, a filter press, or the like and the resulting powder is dried.

(3): The method in which the aqueous dispersion (X1) is freeze-dried (the so-called lyophilization).

Referring to the above methods (1) and (2), the powder obtained can be dried by means of a fluidized-bed dryer, a vacuum dryer, an air-circulation dryer, or the like known machine.

Furthermore, where necessary, the powder may be classified with an air classifier or the like apparatus to attain a predetermined particle diameter distribution.

The resin particles (C) generally consist of small resin particles (A) and large resin particles (B), with each resin particle (A) adhering to the surface of a resin particle (B). In order to increase the adhesion between the two kinds of particles, it is effective to insure that the resin particles (A) and resin particles (B) will be statically charged to opposite polarities on dispersion in aqueous medium or, in the event that the resin particles (A) and resin particles (B) are charged to the same polarity, to use a species of the surfactant (S) or water-soluble polymer (T) which has a static charge opposite to that of the resin particles (A) and resin particles (B) or insure that the difference in SP value between resin (a) and resin (b) will not be greater than 2.

From particle diameter uniformity and storage stability points of view, generally the resin particles (C) are preferably composed of 0.01 to 60 weight % of resin particles (A) and 40 to 99.99 weight % of resin particles (B), preferably 0.1 to 50 weight % of resin particles (A) and 50 to 99.9 weight % of resin particles (B).

From particle diameter uniformity, powder flowability and storage stability points of view, the resin particles (C)

are preferably such that at least 5% of the surface of resin particles (B) is covered with resin particles (A), more preferably such that at least 30% of the surface of resin particles (B) is covered with resin particles (A). The surface covering rate can be calculated by means of the following equation based on an SEM (scanning electron microscopy) image analysis.

Surface covering rate (%)=[the area covered with resin particle (A)/the area covered with resin particle (A)+the area where resin particle (B) is exposed] ×100

From particle diameter uniformity points of view, the coefficient of variation of the volume distribution of resin particles (C) is preferably not larger than 30%, more preferably between 0.1% and 15%.

Moreover, the volume average particle diameter/number average particle diameter of resin particles (C) is preferably not more than 1.4, more preferably between 1.0 and 1.2.

Incidentally, the volume average particle diameter and number average particle diameter can be concurrently measured with Multitizer III (manufactured by Coulter).

The resin particles (C) according to the invention can be provided with the desired surface convexoconcave by controlling the particle diameters of resin particles (A) and (B) and varying the surface covering rate of resin particle (A) on the surface of resin particle (B). For the purpose of improving powder flowability, the BET specific surface area of resin particles (c) is preferably controlled between 0.5 m$^2$/g and 5.0 m$^2$/g. In the context of the invention, BET specific surface area is the area measured with a specific surface area analyzer such as Quantasorb (manufactured by Yuasa Ionics) (measuring gas: He/Kr=99.9/0.1 vol %, calibration gas: nitrogen).

Similarly from powder flowability points of view, the surface average centerline roughness Ra of resin particles (C) is preferably between 0.01 μm and 0.8 μm. Ra is the arithmetic mean of absolute values of the deviation between the roughness curve and its centerline and, for example, can be measured with a scanning probe microscopic system (manufactured by Toyo Technica).

The shape of resin particles (C) is preferably spherical from powder flowability, melt leveling and other points of view. In this connection, it is preferable that resin particles (A) and resin particles (B) should also be spherical. The Wadell practical sphericity of resin particles (C) is preferably 0.85 to 1.00, more preferably 0.90 to 1.00. Incidentally, Wadell practical sphericity can be calculated from the ratio of the diameter of a circle having an area equal to the projected area of a particle and the diameter of a circumcircle having the smallest area as circumscribed to the projected image of the particle. The projected image of a particle can be obtained by, for example, a scanning electron microscope (SEM).

The aqueous dispersion (X2) of resin particles (B) can be obtained by cleaving the mutually adherent resin particles (A) and (B) from each other in the aqueous dispersion (X1) and removing the resin particles (A) from this aqueous dispersion or dissolving the resin particles (A) without involving dissolution of resin particles (B) in the aqueous dispersion (X1). The dissolved resin particles (A) may be separated and removed where necessary.

Then, by removing the aqueous medium from this aqueous dispersion (X2), the resin particles (B) can be obtained. As to the method of removing the aqueous medium, the same methods as described for resin particles (C) can be employed.

Regarding the technology for cleaving the adherent resin particles (A) and (B) from each other in the aqueous dispersion (X1), the following methods, among others, can be mentioned.

(1): The method in which the aqueous dispersion (X1) is sonicated.

(2): The method in which the aqueous dispersion (X1) is diluted with a large quantity of water or a water-soluble organic solvent, such as methanol, ethanol or acetone, and given a shear by stirring.

(3): The method in which an acid, an alkali or an inorganic salt is added to the aqueous dispersion (X1) and the dispersion is given a shear by stirring.

(4): The method in which the aqueous dispersion (X1) is heated and given a shear by stirring.

(5): In the case where the aqueous dispersion (X1) contains a solvent [when a solvent solution of resin (a) and/or a solvent solution of resin (b) has been dispersed in aqueous medium or dissolved in aqueous medium], the method comprising removing the solvent.

The technology for dissolving the resin particles (A) in aqueous dispersion (X1) includes the following methods, among others.

(1) As applicable to the case in which the resin (a) is a resin having an acidic functional group, e.g. carboxyl, phosphate, sulfo or the like (generally the molecular weight per acidic functional group is preferably not more than 1,000), the method comprising adding a basic substance, e.g. sodium hydroxide, potassium hydroxide, ammonia, DBU or the like, or an aqueous solution thereof to the aqueous dispersion (X1).

(2) As applicable to the case in which the resin (a) is a resin having a basic functional group, e.g. primary amino, secondary amino, tertiary amino, or quaternary ammonium (generally the molecular weight per basic functional group is preferably not more than 1,000), the method comprising adding an acid, e.g. hydrochloric aid, sulfuric acid, phosphoric acid, acetic acid or the like, or an aqueous solution thereof to the aqueous dispersion (X1).

(3) As applicable to the case in which the resin (a) is soluble in the defined solvent (U) (generally the difference in SP between the resin (a) and the solvent (U) is preferably not more than 2.5), the method which comprises adding the defined solvent (U) to the aqueous dispersion (X1).

The technology for removing resin particles (A) or a solution thereof from the aqueous dispersion includes the following methods, among others.

(1): The method in which the dispersion is filtered through a filter paper, cloth or screen having a given mesh size to selectively remove the resin particles (B).

(2): The method in which the dispersion is centrifuged to selectively collect the resin particles (B) and remove a supernatant containing the resin particles (A) or solution thereof.

The resin particles (B) of the invention can be provided with a smooth surface or a suitable convexoconcave by varying the particle diameter ratio of resin particles (A) to (B), the surface covering rate of resin particles (A) on the surface of resin particles (B) in the aqueous dispersion (X1), and/or the depth of embedment of resin particles (A) in resin particles (B) at the interface between the resin particle (B) in aqueous dispersion (X1) and the aqueous medium.

The surface covering rate of resin particles (B) by resin particles (A) and the depth of embedment of resin particles (A) in resin particles (B) can be controlled by the following methods.

(1): The covering rate and depth can be increased by imparting opposite static charges to resin particles (A) and (B) in the production of said aqueous dispersion (X1). The increases in covering rate and depth become greater as the charges of resin particles (A) and (B) are respectively increased.

(2): When it is so arranged that both resin particles (A) and (B) are charged to the same sign (positive or negative) in the production of said aqueous dispersion (X1), the covering rate and depth tend to be lowered and diminished. In this situation, when the surfactant (S) and/or water-soluble polymer (T) [particularly one having an opposite charge to resin particles (A) and (B)] is employed, the covering rate is increased. When the water-soluble polymer (T) is used, the higher the molecular weight of the water-soluble polymer (T) is, the smaller is the depth.

(3): When, in the production of aqueous dispersion (X1), the resin (a) is a resin having an acidic functional group, e.g. carboxyl, phosphate, sulfo, or the like (generally the molecular weight per acidic functional group is preferably not more than 1,000), the lower the pH of the aqueous medium is, the greater are the covering rate and depth. Conversely, the higher the pH is, the smaller are the covering rate and depth.

(4): When, in the production of aqueous dispersion (X1), the resin (a) is a resin having a basic functional group such as primary amino, secondary amino, tertiary amino, quaternary ammonium base or the like (generally the molecular weight per basic functional group is preferably not more than 1,000), the higher the pH of aqueous medium is, the greater are the covering rate and depth. Conversely, the lower the pH of aqueous medium is, the lesser is the covering rate and depth of embedment.

(5): The smaller the difference in SP between resin particles (a) and resin particles (b) is, the greater are the covering rate and depth.

For improved powder flowability, the BET specific surface area of resin particles (B) is preferably 0.5 to 5.0 $m^2/g$ and the surface average centerline roughness Ra is preferably 0.01 to 0.8 $\mu m$.

The shape of resin particles (B) or resin particles (B) is preferably spherical from powder flowability, melt leveling and other characteristics points of view. Thus, Wadell practical sphericity is preferably 0.85 to 1.00, more preferably 0.90 to 1.00.

BEST MODE FOR CARRYING OUT THE INVENTION

The following examples illustrate the present invention in further detail without defining the scope of the invention. In the description that follows, all "parts" are by weight and all "%" are weight %.

PRODUCTION EXAMPLE 1

A reaction vessel fitted with a stirring rod and a thermometer was charged with 47 parts of styrenated phenol-polyethylene oxide adduct (Eleminol HB-12, product of Sanyo Chemical Industries) and 232 parts of bisphenol A diglycidyl ether (Epikote 828, product of Yuka-Shell) to prepare a homogeneous solution. Under stirring, water was added dropwise into the reaction vessel. When the quantity of water so added had reached 31 parts, the system became emulsified and assumed a milk-white color. Then, 224 parts of water was further added dropwise to give an emulsion (1). After the internal temperature of the system was increased to 70° C. by heating, a solution prepared by dissolving 20 parts of ethylenediamine in 446 parts of water was added dropwise over 2 hours at a constant temperature of 70° C. After completion of dropwise addition, the reaction and ripening were carried out at 90° C. for 5 hours to give an amine-cured epoxy resin aqueous dispersion [a microfine powder dispersion slurry A1]. The volume average particle diameter of this [microfine powder dispersion slurry A1] as measured with the laser particle diameter distribution analyzer LA-920 (manufactured by Horiba Seisakusho) was 0.81 $\mu m$. A portion of the [microfine powder dispersion slurry A1] was centrifuged, followed by repeating twice the procedure of addition of water and centrifuging. The isolated microfine powder was dried. The Tg (measured by DSC; the same applies to all Tg values hereinafter) of this resin fraction was 120° C.

PRODUCTION EXAMPLE 2

A reaction vessel fitted with a stirring rod and a thermometer was charged with 683 parts of water, 11 parts of methacrylic acid-ethylene oxide adduct sulfate ester sodium salt (Eleminol RS-30, product of Sanyo Chemical Industries), 139 parts of styrene, 138 parts of methacrylic acid, and 1 part of ammonium persulfate, and the whole was stirred at 400 rpm for 15 minutes to give a white emulsion. This emulsion was heated to an internal temperature of 75° C. and further reacted at this temperature for 5 hours. Then, 30 parts of 1% aqueous solution of ammonium persulfate was added and the mixture was matured at 75° C. for 5 hours to give an aqueous dispersion of vinyl resin (styrene/methacrylic acid/methacrylic acid-ethylene oxide adduct sulfate ester sodium salt copolymer) [a microfine powder dispersion slurry A2]. The volume average particle diameter of this [microfine powder dispersion slurry A2] as measured with LA-920 was 0.15 $\mu m$. A portion of the [microfine powder dispersion slurry A2] was dried to isolate the resin fraction. The Tg temperature of this resin fraction was 154° C.

PRODUCTION EXAMPLE 3

A reaction vessel equipped with a condenser, stirrer and nitrogen inlet pipe was charged with 343 parts of bisphenol A-ethylene oxide(2 mols) adduct, 166 parts of isophthalic acid, and 2 parts of dibutyltin oxide and the reaction was carried out under atmospheric pressure at 230° C. for 8 hours and further under a reduced pressure of 10 to 15 mmHg for 5 hours. After cooling to 110° C., 17 parts of isophorone diisocyanate in toluene was added and reacted at 110° C. for 5 hours. The solvent was then removed to give a [urethane-modified polyester (1)] with a weight average molecular weight of 72,000 and a free isocyanate content of 0.7%.

In the same manner as above, 570 parts of bisphenol A-ethylene oxide(2 mols) adduct and 217 parts of terephthalic acid were subjected to polycondensation reaction under atmospheric pressure at 230° C. for 6 hours to give an unmodified [polyester (2)] with a number average molecular weight of 2,400, a hydroxyl value of 51 and an acid value of 5.

In 2,000 parts of ethyl acetate were dissolved 200 parts of [urethane-modified polyester (1)] and 800 parts of [polyester 2], followed by mixing to give a [resin solution 1]. A portion of this [resin solution 1] was dried in vacuo to isolate a resin fraction. The Tg of this resin fraction was 55° C.

A beaker was charged with 500 parts of water and 4 parts of nonylphenol-ethylene oxide(14 mol) adduct (Nonipol 200, product of Sanyo Chemical Industries) to prepare a homogeneous solution. While this solution was stirred using TK Homomixer at 18,000 rpm, the [resin solution 1] was added and the mixture was stirred for 15 minutes. This mixture was transferred to a reaction vessel equipped with a stirring rod and a thermometer, in which it was heated to distill off the ethyl acetate and further to 98° C., at which temperature the reaction was carried out for 5 hours to give a [microfine powder dispersion slurry A3] comprising a mixture of the water-extension reaction product of [urethane-modified polyester (1)] and said [polyester (2)]. The volume average particle diameter of this [microfine powder dispersion slurry A3] as measured with LA-920 was 0.21 µm. A portion of the [microfine powder dispersion slurry A3] was centrifuged and, after addition of water, recentrifuged. This centrifugal procedure was repeated twice, followed by drying to isolate a resin fraction. The Tg of this resin fraction was 64° C.

PRODUCTION EXAMPLE 4

A reaction vessel fitted with a stirring rod and a thermometer was charged with 787 parts of polycaprolactonediol (mol. wt. 2,000) and 800 parts of polyetherdiol (mol. wt. 4,000, EO content 50 wt. %, PO content 50 wt. %), and the water was removed under reduced pressure at 120° C. The water content after this dehydration was 0.05%. Then, 55.5 parts of HDI, 65.5 parts of hydrogenated MDI, and 0.6 part of dibutyltin dilaurate were added and the reaction was carried out at 80° C. for 5 hours. The reaction product was designated as [water-soluble polymer T1].

Then, 100 parts of [microfine powder dispersion slurry A1], 1 part of [water-soluble polymer T1], and 107 parts of water were mixed and stirred to give a milk-white liquid. This liquid was designated as [dispersion 1].

PRODUCTION EXAMPLE 5

784 parts of water, 136 parts of [microfine powder dispersion slurry A2], and 80 parts of a 48.5% aqueous solution of sodium dodecyl diphenyl ether disulfonate (Eleminol MON-7, product of Sanyo Chemical Industries) were mixed and stirred to give a milk-white liquid. This was designated as [dispersion 2].

PRODUCTION EXAMPLE 6

634 parts of water, 286 parts of [microfine powder dispersion slurry A3], and 154 parts of a 48.5% aqueous solution of sodium dodecyl diphenyl ether disulfonate (Eleminol MON-7, product of Sanyo Chemical Industries) were mixed and stirred to give a milk-white liquid. This was designated as [dispersion 3].

PRODUCTION EXAMPLE 7

In 100 parts of water was dissolved 1 part of polyvinyl alcohol (PVA-235, product of Kuraray). This was designated as [dispersion 4].

PRODUCTION EXAMPLE 8

A reaction vessel fitted with a stirring rod and a thermometer was charged with 2,000 parts of a polycaprolactonediol with a hydroxyl value of 56 [Placcel L220AL, product of Daicel Chemical] and the polycaprolactonediol was dehydrated for 1 hour under heating to 110° C. at a reduced pressure of 3 mmHg. Then, 457 parts of IPDI was added and the reaction was carried out at 110° C. for 10 hours to give an isocyanate group-terminated urethane prepolymer. The free isocyanate content of this urethane prepolymer was 3.6%. This was designated as [prepolymer 1].

PRODUCTION EXAMPLE 9

A reaction vessel fitted with a stirring rod and a thermometer was charged with 50 parts of ethylenediamine and 50 parts of MIBK, and the reaction was carried but at 50° C. for 5 hours. The resulting ketimine compound was designated as [curing agent 1].

EXAMPLE 1

In a beaker, 150 parts of [prepolymer 1] was admixed with 6 parts of [curing agent 1], and after 250 parts of [dispersion 1] was added, the whole mixture was blended in Ultra Disperser (manufactured by Yamato Scientific Co.) at 9,000 rpm for 1 minute.

After blending, the mixture was fed to a reaction vessel fitted with a stirring rod and a thermometer and the reaction was carried out at 50° C. for 10 hours to give an aqueous dispersion (XF1) Then, 1 part of an antiblocking agent [Sylloid 978, product of Fugi-Davidson Chemical] and 0.5 part of a light stabilizer [DIC-TBS, product of Dainippon Ink and Chemicals] were added and the dispersion was filtered and dried to give resin particles (F1).

EXAMPLE 2

In a beaker, 150 parts of [prepolymer 1], 6 parts of [curing agent 1], and 40 parts of ethyl acetate were admixed and after 457 parts of [dispersion 2] was added, the whole mixture was blended using TK Homomixer (manufactured by Tokushu Kika) at 12,000 rpm for 10 minutes.

After blending, the mixture was fed to a reaction vessel fitted with a stirring rod and a thermometer, and the removal of the solvent and the reaction were carried out at 50° C. for 10 hours to give an aqueous dispersion (XF2). This was filtered and dried to give resin particles (F2).

EXAMPLE 3

To 100 parts of aqueous dispersion (XF2) was added 100 parts of 5% aqueous solution of sodium hydroxide, and using TK Homomixer (manufactured by Tokushu Kika) set to 40° C., the mixture was agitated at 12,000 rpm for 10 minutes to dissolve out the microfine particles derived from [microfine powder dispersion slurry A2] from the surface of (F2). The slurry was then centrifuged, the supernatant discarded, 100 parts of water added, and the mixture recentrifuged. This procedure was repeated twice, followed by drying to give resin particles (F3).

EXAMPLE 4

In a breaker, 150 parts of [prepolymer 1], 6 parts of [curing agent 1], and 40 parts of ethyl acetate were blended and, after 457 parts of [dispersion 3] was added, the whole was admixed with TK Homomixer (manufactured by Tokushu Kika) at 12,000 rpm for 10 minutes.

After admixing, the mixture was transferred to a reaction vessel fitted with a stirring rod and a thermometer and the removal of the solvent and the reaction were carried out at 50° C. for 10 hours to give an aqueous dispersion (XF4). This was followed by filtration and drying to give resin particles (F4).

COMPARATIVE EXAMPLE 1

Except that [dispersion 4] was used in lieu of [dispersion 1], the procedure of Example 1 was otherwise repeated to give resin particles (G1).

EXAMPLE 5

A beaker was charged with 240 parts of [resin solution 1], 20 parts of the mold release agent trimethylolpropane tribehenate (m.p. 58° C., melt viscosity 24 cps), and 4 parts of the colorant copper phthalocyanine and using TK Homomixer set to 50° C., the mixture was agitated at 12,000 rpm for uniform dissolution and dispersion to give [resin solution 1B].

A beaker was charged with 500 parts of deionized water, 500 parts of [dispersion 1], and 0.2 part of sodium dodecylbenzenesulfonate to prepare a homogeneous solution. The temperature was then increased to 50° C., and under agitation with TK Homomixer at 12,000 rpm, 300 parts of [resin solution 1B] was added and the whole was stirred for 10 minutes. This mixture was transferred to a flask fitted with a stirring rod and a thermometer and the temperature was increased to remove the ethyl acetate. The temperature was further elevated to 98° C., at which temperature the reaction was carried out for 5 hours to give an aqueous dispersion (XF5). This was followed by filtration and drying to give resin particles (F5).

EXAMPLE 6

A beaker was charged with 240 parts of [resin solution 1], 20 parts of the mold release agent trimethylolpropane tribehenate (m.p. 58° C., melting viscosity 24 cps), and 4 parts of the colorant copper phthalocyanine. The temperature was increased to 50° C. and using TK Homomixer at 12,000 rpm, the whole was agitated for uniform dissolution and dispersion to give [resin solution 1B].

A beaker was charged with 500 parts of [dispersion 2] to prepare a homogeneous solution. The temperature was then increased to 50° C., and under agitation by TK Homomixer at 12,000 rpm, 214 parts of [resin solution 1B] was added and the whole mixture was stirred for 10 minutes. This mixture was transferred to a flask equipped with a stirring rod and a thermometer and the temperature was increased to distill the ethyl acetate off. The temperature was further elevated to 98° C., at which temperature the reaction was carried out for 5 hours to give an aqueous dispersion (XF6). This was followed by filtration and drying to give resin particles (F6).

EXAMPLE 7

To 100 parts of said aqueous dispersin (XF6) was added 100 parts of a 5% aqueous solution of sodium hydroxide and using TK Homomixer (manufactured by Tokushu Kika) and at a temperature setting of 40° C., the mixture was agitated at 12,000 rpm for 10 minutes to dissolve out the microfine particles originating from [microfine powder dispersion slurry A2] from the surface of (F6). The slurry was then centrifuged to remove the supernatant and, after addition of 100 parts of water, recentrifuged. This procedure was repeated twice, followed by drying to give resin particles (F7).

EXAMPLE 8

A beaker was charged with 240 parts of [resin solution 1], 20 parts of the mold release agent trimethylolpropane tribehenate (m.p. 58° C., melt viscosity 24 cps), and 4 parts of the colorant copper phthalocyanine, and the charge was agitated at 50° C. using TK Homomixer at 12,000 rpm for uniform dissolution and dispersion to give [resin solution 1B].

Then, 500 parts of [dispersion 3] was placed in a beaker and evenly dissolved. The temperature was then increased to 50° C. and under agitation by TK Homomixer at 12,000 rpm, 214 parts of [resin solution 1B] was added and the whole was stirred for 10 minutes. This mixture was then transferred to a flask equipped with a stirring rod and a thermometer and the temperature was increased to remove ethyl acetate and further elevated to 98° C., at which temperature the reaction was carried out for 5 hours to give an aqueous dispersion (XF8). This dispersion was subjected to filtration and drying to give resin particles (F8).

COMPARATIVE EXAMPLE 2

Except that [dispersion 4] was used in lieu of [dispersion 1], the procedure of Example 5 was otherwise repeated to give resin particles (G2).

Example of Determination of physical properties-1

The resin particles (F1) to (F8), (G1) and (G2) obtained in Examples 1 to 8 and Comparative Examples 1 and 2 were respectively dispersed in water and the particle diameter distribution was determined with a Coulter counter. The coefficient of variation of volume distribution is the value calculated by means of the computation formula (standard deviation/volume average particle diameter×100). The surface covering rate, BET specific surface area, and surface average centerline roughness of each resin particle were determined. The results are set forth in Table 1.

TABLE 1

|  | Ex. | | | | | | | | Compar. Ex. | |
| --- | --- | --- | --- | --- | --- | --- | --- | --- | --- | --- |
| Resin particles | 1<br>F1 | 2<br>F2 | 3<br>F3 | 4<br>F4 | 5<br>F5 | 6<br>F6 | 7<br>F7 | 8<br>F8 | 1<br>G1 | 2<br>G2 |
| The (A) content of resin particles (%) | 16.4 | 10.5 | — | 10.5 | 33.7 | 18.8 | — | 18.9 | — | — |
| The (B) content of resin particles (%) | 83.6 | 89.5 | — | 89.5 | 66.3 | 81.2 | — | 81.1 | — | — |
| Volume average particle diameter of (A) ($\mu$m) | 0.81 | 0.15 | — | 0.21 | 0.81 | 0.15 | — | 0.21 | — | — |
| Volume average particle diameter of (B) ($\mu$m) | 127 | 7.1 | — | 7.4 | 2.7 | 5.2 | — | 5.4 | — | — |

TABLE 1-continued

| | Ex. | | | | | | | | Compar. Ex. | |
|---|---|---|---|---|---|---|---|---|---|---|
| Resin particles | 1<br>F1 | 2<br>F2 | 3<br>F3 | 4<br>F4 | 5<br>F5 | 6<br>F6 | 7<br>F7 | 8<br>F8 | 1<br>G1 | 2<br>G2 |
| Volume average particle diameter ratio (A)/(B) | $6.8 \times 10^{-3}$ | $2.1 \times 10^{-2}$ | — | $2.8 \times 10^{-2}$ | $3.0 \times 10^{-1}$ | $2.9 \times 10^{-2}$ | — | $3.9 \times 10^{-2}$ | — | — |
| Volume average particle diameter ($\mu$m) | 130 | 7.1 | 6.8 | 7.5 | 4.1 | 5.2 | 4.8 | 5.5 | 140 | 5.2 |
| (Volume average particle diameter) ÷ (number average particle diameter) | 1.12 | 1.13 | 1.12 | 1.15 | 1.09 | 1.10 | 1.08 | 1.12 | 2.31 | 2.43 |
| Coefficient of variation (%) of volume distribution | 10.2 | 12.1 | 9.8 | 12.7 | 7.4 | 8.2 | 6.6 | 8.2 | 58.1 | 47.4 |
| Surface covering rate (%) | 100 | 96 | Not more than 1% | 87 | 98 | 94 | Not more than 1% | 85 | — | — |
| BET specific surface area (m$^2$/g) | 2.1 | 3.8 | 4.2 | 3.9 | 3.6 | 5.6 | 5.8 | 4.6 | 1.4 | 4.2 |
| Surface average centerline roughness ($\mu$m) | 0.61 | 0.21 | 0.26 | 0.29 | 0.52 | 0.32 | 0.22 | 0.34 | 0.21 | 0.19 |
| Wadell practical sphericity | 0.99 | 0.98 | 0.98 | 0.98 | 0.97 | 0.98 | 0.98 | 0.97 | 0.97 | 0.98 |

INDUSTRIAL APPLICABILITY

The method of the present invention provides for the following effects.
1. Without using inorganic microfine particles, a resin particle dispersion and resin particles which are uniform in particle diameter can an be obtained.
2. Since resin particles are formed form an aqueous dispersion, resin particles can be produced with safety and at low cost as compared with the conventional production technology.
3. Resin particles with improved powder flowability and storage stability can be obtained.
4. Resin particles which are highly heat-resistant and resin particles which melt on heating to give a coating with good mechanical properties can be obtained.

Because of the above effects, the resin dispersion and resin particles obtainable by the method of the invention are of great use in such applications as slush molding resin, powder coatings, spacers for the manufacture of liquid crystal and other electronic devices or components, standard particles for electronic measuring instruments, toners for electrophotography, electrostatic recording, electrostatic printing, etc., various hot-melt adhesives, and other molding materials.

The invention claimed is:

1. A method of producing an aqueous dispersion which comprises
    dispersing a resin (b) or a solvent solution thereof, or a precursor (b0) of said resin (b) or a solvent solution thereof in an aqueous dispersion of resin particles (A) composed of resin (a) and
    causing the precursor (b0) to react in the case where the precursor (b0) or a solvent solution thereof is used, to prepare resin particles (B) composed of said resin (b) in said aqueous dispersion of resin particles (A) and
    thereby giving an aqueous dispersion (X1) of resin particles (C) having a structure such that the resin particle (A) adheres to the surface of the resin particle (B),
    wherein said resin (b) is at least one resin selected from the group consisting of polyurethane resin, epoxy resin, polyester resin, polyamide resin, polyimide resin, silicon resin, phenol resin, melamine resin, urea resin, aniline resin and polycarbonate resin, and
    wherein the volume average particle diameter of resin particles (A)/volume average particle diameter of resin particles (B) is 0.001 to 0.3.

2. The method according to claim 1,
    wherein the resin particle (C) comprises 0.1 to 50 weight % of the resin particle (A) and 50 to 99.9 weight % of the resin particle (B).

3. A method of producing an aqueous dispersion which comprises
    dispersing a resin (b) or a solvent solution thereof, or a precursor (b0) of said resin (b) or a solvent solution thereof in an aqueous dispersion of resin particles (A) composed of resin (a) and
    causing the precursor (b0) to react in the case where the precursor (b0) or a solvent solution thereof is used, to prepare resin particles (B) composed of said resin (b) in said aqueous dispersion of resin particles (A) and
    thereby giving an aqueous dispersion (X1) of resin particles (C) having a structure such that the resin particle (A) adheres to the surface of the resin particle (B),
    wherein the coefficient of variation of volume distribution of resin particles (C) is 0.1 to 15%.

4. The method according to claim 3,
    wherein the resin particle (C) has a structure such that at least 5% of the surface of the resin particle (B) is covered with the resin particle (A).

5. The method according to claim 3,
    wherein the volume average particle diameter/number average particle diameter of resin particles (C) is 1.0 to 1.2.

6. The method according to claim 1,
    wherein the volume average particle diameter of resin particles (A) is 0.01 to 30 $\mu$m and the volume average particle diameter of resin particles (B) is 0.1 to 300 $\mu$m.

7. A method of producing an aqueous dispersion which comprises
    dispersing a precursor (b0) of said resin (b), the precursor (b0) comprising the reactive group-containing prepolymer ($\alpha$) and the curing agent ($\beta$), or a solvent solution thereof in an aqueous dispersion of resin particles (A) composed of resin (a)
    causing the precursor (b0) to react, to prepare resin particles (B) composed of said resin (b) obtained by reaction of the prepolymer ($\alpha$) and the curing agent ($\beta$), in said aqueous dispersion of resin particles (A) and thereby giving an aqueous dispersion (X1) of resin particles (C) having a structure such that the resin particle (A) adheres to the surface of the resin particle (B).

8. The method according to claim 7,
wherein the reactive group-containing prepolymer (α) has at least one reactive group selected from the group consisting of isocyanato, blocked isocyanato and epoxy and that the curing agent (β) is an active hydrogen group-containing compound (β1).

9. The method according to claim 8,
wherein the active hydrogen group-containing compound (β1) is a ketimine compound.

10. A method of producing an aqueous dispersion which comprises
dispersing a resin (b) or a solvent solution thereof, or a precursor (b0) of said resin (b) or a solvent solution thereof in an aqueous dispersion of resin particles (A) composed of resin (a)
causing the precursor (b0) to react in the case where the precursor (b0) or a solvent solution thereof is used, to prepare resin particles (B) composed of said resin (b) in said aqueous dispersion of resin particles (A),
thereby giving an aqueous dispersion (X1) of resin particles (C) having a structure such that the resin particle (A) adheres to the surface of the resin particle (B),
cleaving the adherent resin particle (A) and resin particle (B) from each other in the aqueous dispersion (X1) and
removing resin particles (A) from the aqueous dispersion to give an aqueous dispersion (X2) of resin particles (B).

11. A method of producing an aqueous dispersion which comprises
dispersing a resin (b) or a solvent solution thereof, or a precursor (b0) of said resin (b) or a solvent solution thereof in an aqueous dispersion of resin particles (A) composed of resin (a) and
causing the precursor (b0) to react in the case where the precursor (b0) or a solvent solution thereof is used, to prepare resin particles (B) composed of said resin (b) in said aqueous dispersion of resin particles (A),
thereby giving an aqueous dispersion (X1) of resin particles (C) having a structure such that the resin particle (A) adheres to the surface of the resin particle (B) and
dissolving the resin particles (A) in the aqueous dispersion (X1) by adding a basic substance or an aqueous solution thereof in the case the resin (a) is a resin having an acidic functional group, adding an acid or an aqueous solution thereof in the case the resin (a) is a resin having a basic functional group, or adding a solvent (U) in the case the resin (a) is soluble in the solvent (U) to give an aqueous dispersion (X2) of resin particles (B).

12. The method according to claim 10,
wherein the coefficient of variation of volume distribution of resin particles (B) is 0.1 to 15%.

13. The method according to claim 10,
wherein the volume average particle diameter/number average particle diameter of resin particles (B) is 1.0 to 1.2.

14. An aqueous resin dispersion obtainable by the method according to claim 1.

15. A resin particle available on removal of aqueous medium from the aqueous resin dispersion according to claim 14.

16. A resin particle available on removal of aqueous medium from an aqueous resin dispersion obtainable by a method comprising
dispersing a resin (b) or a solvent solution thereof, or a precursor (b0) of said resin (b) or a solvent solution thereof in an aqueous dispersion of resin particles (A) composed of resin (a) and
causing the precursor (b0) to react in the case where the precursor (b0) or a solvent solution thereof is used, to prepare resin particles (B) composed of said resin (b) in said aqueous dispersion of resin particles (A) and
thereby giving an aqueous dispersion (X1) of resin particles (C) having a structure such that the resin particle (A) adheres to the surface of the resin particle (B),
which has a surface average centerline roughness Ra value of 0.01 to 0.8 μm.

17. The resin particle according to claim 16,
which has a BET specific surface area of 0.5 to 5.0 $m^2/g$.

18. The resin particle according to claim 16, which has a Wadell practical sphericity of 0.90 to 1.00.

19. A particulate resin comprising
resin particles (C) having a structure such that a resin particle (A) composed of a resin (a) adheres to the surface of a resin particle (B) composed of a resin (b)
wherein
(1): the volume average particle diameter ratio of resin particles (A) to resin particles (B) is 0.00 1 to 0.3,
(2): the volume average particle diameter of resin particles (A) is 0.01 to 30 μm and the volume average particle diameter of resin particles (B) is 0.1 to 300 μm,
(3): the volume average particle diameter/number average particle diameter of resin particles (C) is 1.00 to 1.20,
(4): at least 5% of the surface of the resin particle (B) is covered with the resin particle (A),
(5): resin particles (C) have a BET specific surface area of 0.5 to 5.0 $m^2/g$,
(6): resin particles (C) have a surface average centerline roughness Ra value of 0.01 to 0.8 μm,
(7): resin particles (C) have a Wadell practical sphericity of 0.90 to 1.00, and
(8): resin (a) and/or resin (b) is at least one resin selected from the group consisting of polyurethane resin, epoxy resin, vinyl resin, and polyester resin.

20. A resin particle according to claim 15, wherein the resin particle is used as a slush molding resin, a powder coating, a spacer for the manufacture of electronic components, a standard particle for electronic measuring instruments, an electron photographic toner, an electrostatic recording toner, an electrostatic printing toner or a hot melt adhesive.

21. A method of producing an aqueous dispersion which comprises
dispersing a resin (b) or a solvent solution thereof, or a precursor (b0) of said resin (b) or a solvent solution thereof in an aqueous dispersion of resin particles (A) composed of resin (a) and
causing the precursor (b0) to react in the case where the precursor (b0) or a solvent solution thereof is used, to prepare resin particles (B) composed of said resin (b) in said aqueous dispersion of resin particles (A),
thereby giving an aqueous dispersion (X1) of resin particles (C) having a structure such that the resin particle (A) adheres to the surface of the resin particle (B) and
cleaving the adherent resin particle (A) and resin particle (B) from each other in the aqueous dispersion to give a mixture aqueous dispersion (X3) of resin particles (A) and resin particles (B).

22. The method according to claim 1,
wherein the melting point of the resin (b) is not less than 35° C.

23. The method according to claim 3,
wherein the resin (b) is a vinyl polymer having Tg of 20° C. to 200° C.

* * * * *